United States Patent
Noguchi et al.

(10) Patent No.: US 9,588,631 B2
(45) Date of Patent: Mar. 7, 2017

(54) DISPLAY APPARATUS, DRIVE CIRCUIT, DRIVING METHOD AND ELECTRONIC APPARATUS

(71) Applicant: Japan Display Inc., Tokyo (JP)

(72) Inventors: Koji Noguchi, Kanagawa (JP); Yoshitoshi Kida, Kanagawa (JP); Kohei Azumi, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 14/824,829

(22) Filed: Aug. 12, 2015

(65) Prior Publication Data

US 2015/0346883 A1  Dec. 3, 2015

Related U.S. Application Data

(63) Continuation of application No. 13/645,179, filed on Oct. 4, 2012, now Pat. No. 9,141,222.

(30) Foreign Application Priority Data

Oct. 12, 2011  (JP) ................................ 2011-224536

(51) Int. Cl.
*G06F 3/047* (2006.01)
*G09G 5/00* (2006.01)
(Continued)

(52) U.S. Cl.
CPC .............. *G06F 3/047* (2013.01); *G06F 3/044* (2013.01); *G06F 3/0412* (2013.01); *G06F 3/0418* (2013.01); *G09G 3/36* (2013.01); *G09G 5/003* (2013.01); *G09G 5/18* (2013.01); *G09G 3/3685* (2013.01); *G09G 2300/0426* (2013.01); *G09G 2310/0297* (2013.01)

(58) Field of Classification Search
CPC ........ G06F 3/041; G06F 3/044; G06F 3/0412; G06F 3/0416
See application file for complete search history.

(56) References Cited

U.S. PATENT DOCUMENTS

2005/0083287 A1   4/2005   Yamazaki et al.
2009/0256818 A1   10/2009  Noguchi et al.
(Continued)

FOREIGN PATENT DOCUMENTS

CN   101620333   1/2010
JP   04-310995   11/1992
(Continued)

OTHER PUBLICATIONS

Japanese Patent Office, Notice of Rejection issued in connection with Japanese Patent Application No. JP2011-224536, mailed Sep. 2, 2014. (9 pages).
(Continued)

*Primary Examiner* — Liliana Cerullo
(74) *Attorney, Agent, or Firm* — K&L Gates LLP

(57) ABSTRACT

A display apparatus includes: a display device; a touch detection device; and a driver unit driving the display device so as to sequentially display M horizontal lines in each of plural unit drive periods forming one frame period and driving the touch detection device in N touch detection periods provided in each unit drive period, in which N is lower than M.

13 Claims, 24 Drawing Sheets

(51) Int. Cl.
*G09G 5/18* (2006.01)
*G09G 3/36* (2006.01)
*G06F 3/041* (2006.01)
*G06F 3/044* (2006.01)

(56) References Cited

U.S. PATENT DOCUMENTS

| | | |
|---|---|---|
| 2010/0001970 A1 | 1/2010 | Yamashita |
| 2010/0013791 A1 | 1/2010 | Haga et al. |
| 2011/0187677 A1 | 8/2011 | Hotelling et al. |
| 2011/0210939 A1 | 9/2011 | Reynolds et al. |
| 2011/0210940 A1 | 9/2011 | Reynolds |
| 2012/0056835 A1* | 3/2012 | Choo .................. G06F 3/0412 345/173 |
| 2012/0262387 A1 | 10/2012 | Mizuhashi et al. |
| 2013/0314361 A1 | 11/2013 | Saitoh et al. |

FOREIGN PATENT DOCUMENTS

| | | |
|---|---|---|
| JP | 07-182107 | 7/1995 |
| JP | 2009-244958 | 10/2009 |
| JP | 2009-258182 | 11/2009 |
| TW | 201003268 | 1/2010 |
| WO | 2012/137800 | 10/2012 |

OTHER PUBLICATIONS

Japanese Office Action issued Mar. 29, 2016 in corresponding Japanese Application No. 2015-083654.
Chinese Office Action issued Jun. 21, 2016 in corresponding Chinese Application No. 201210378169.1.
Taiwanese Office Action issued Sep. 13, 2016 in corresponding Taiwan Appl. No. 101134190.

* cited by examiner

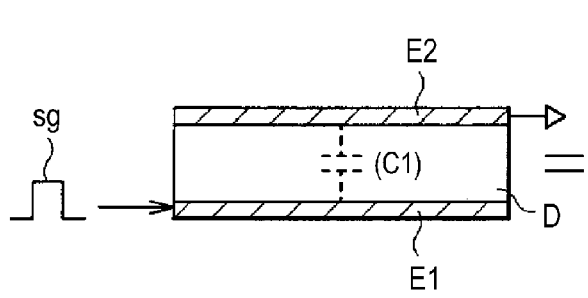
FIG.1A
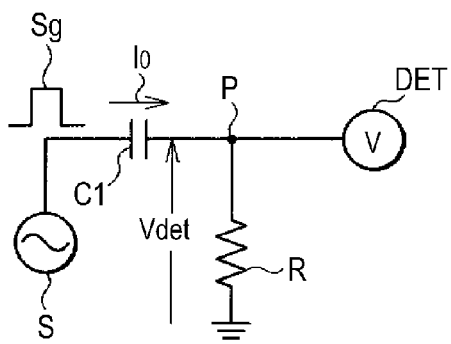
FIG.1B
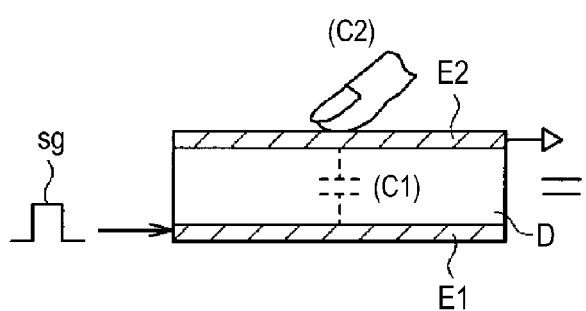
FIG.2A
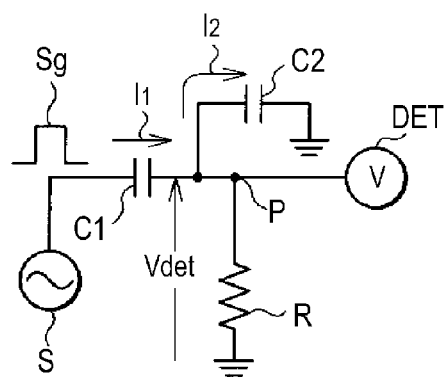
FIG.2B
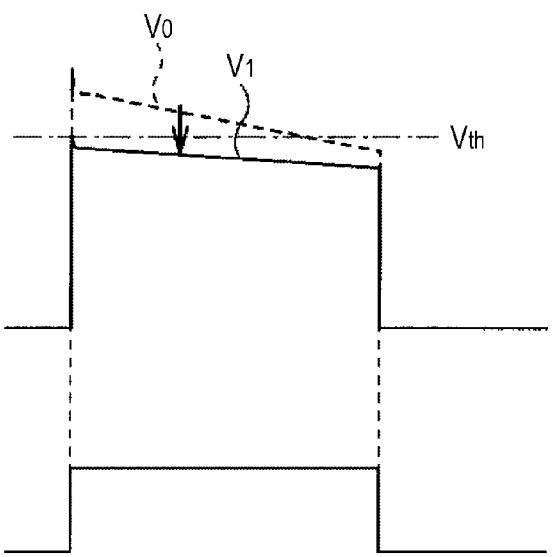
FIG.3A $V_{det}$
FIG.3B $\underset{(V_{com})}{Sg}$

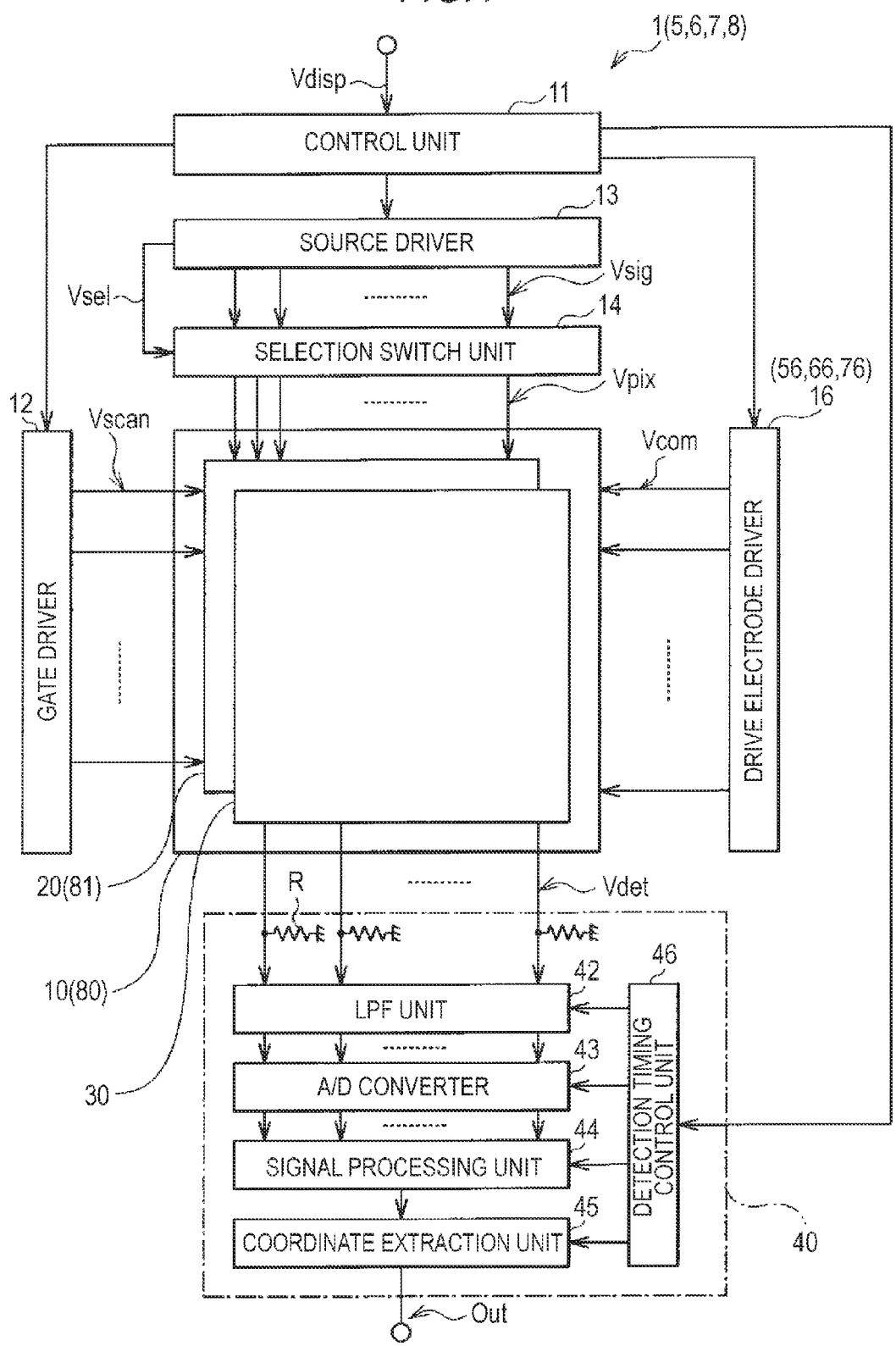

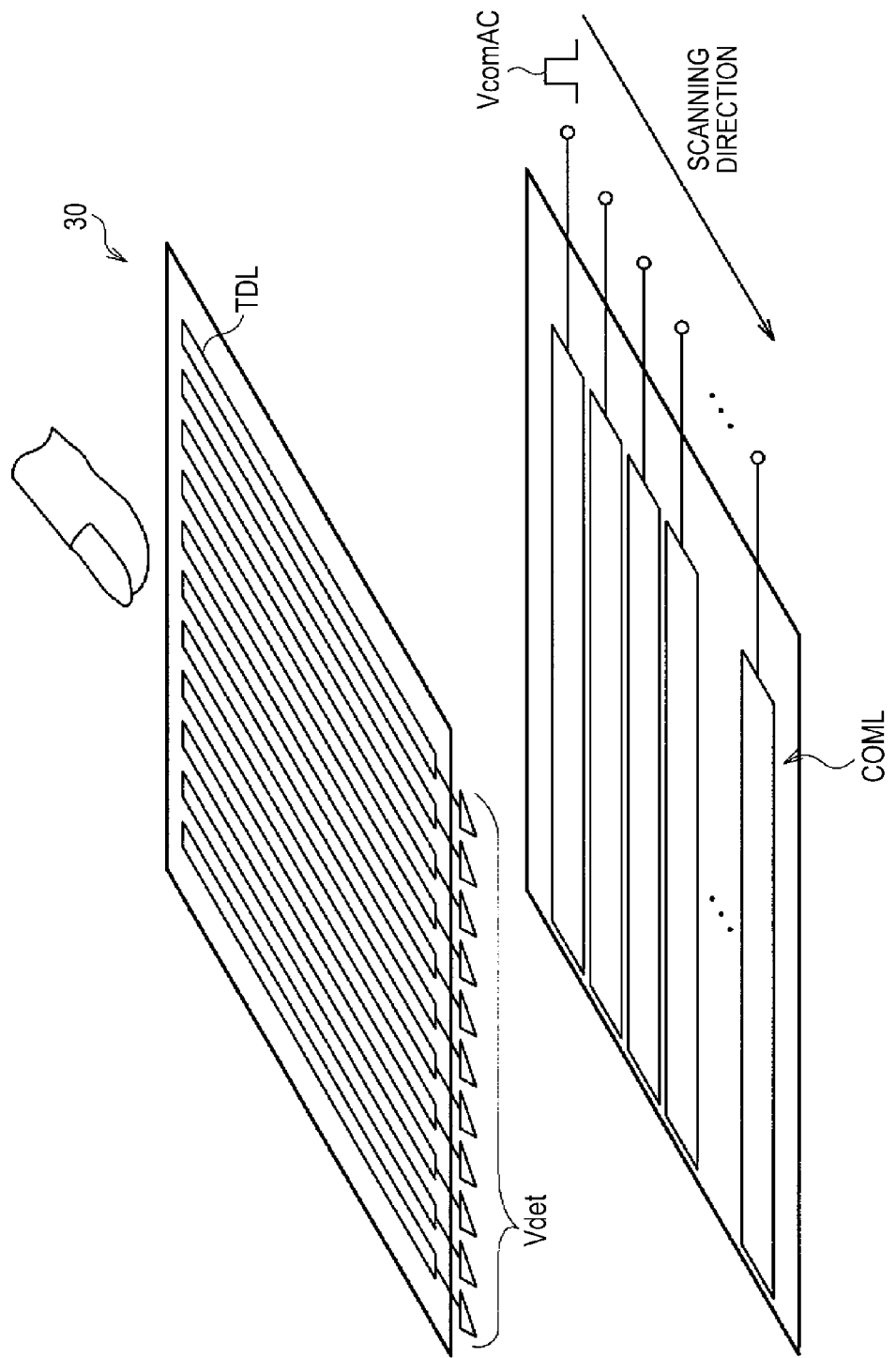

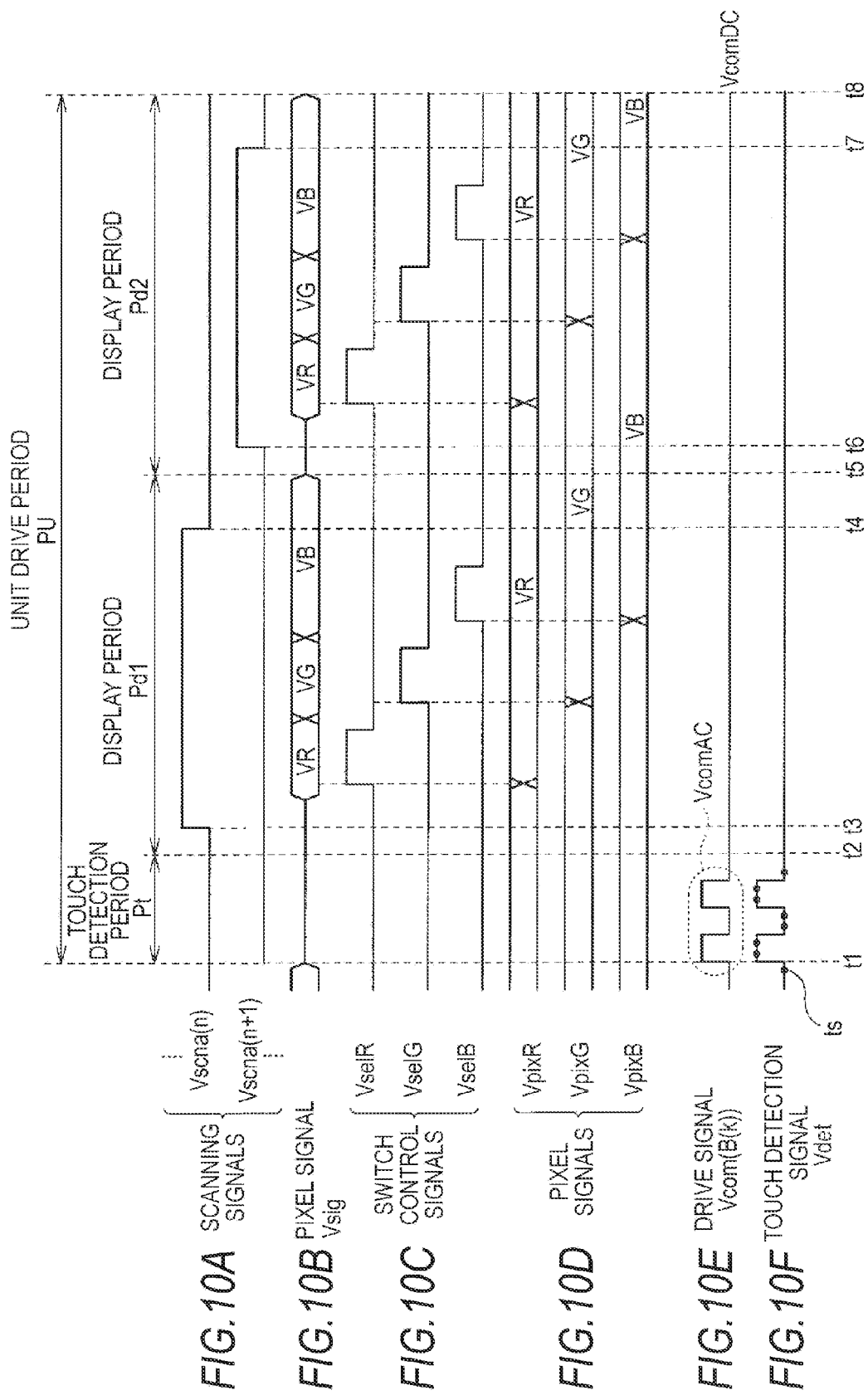

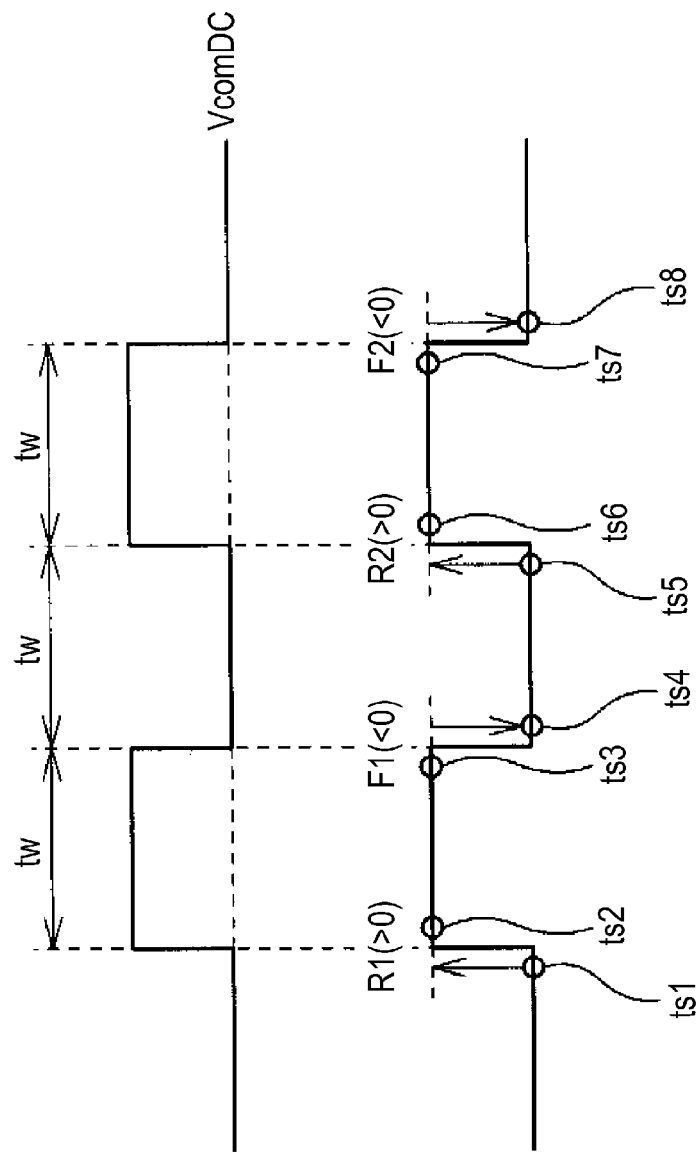

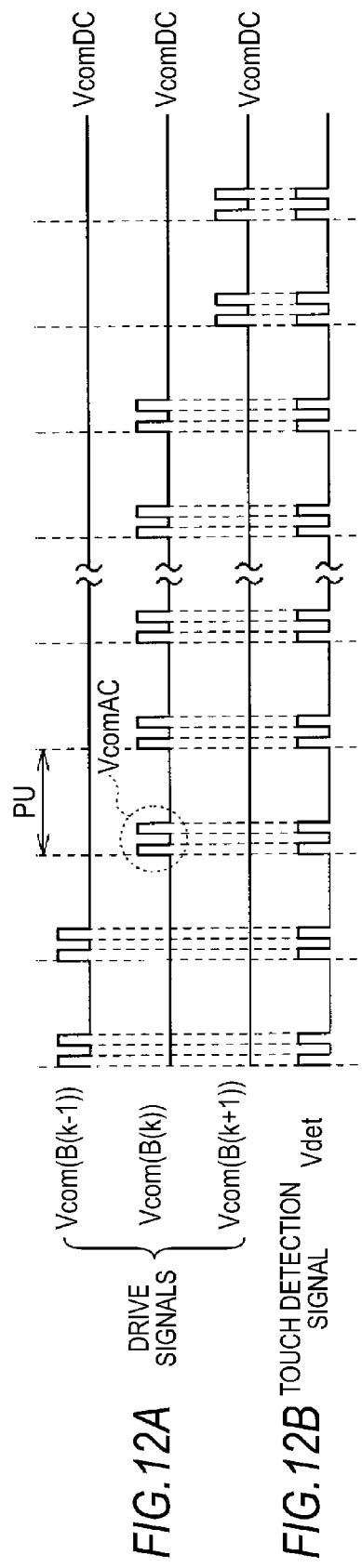

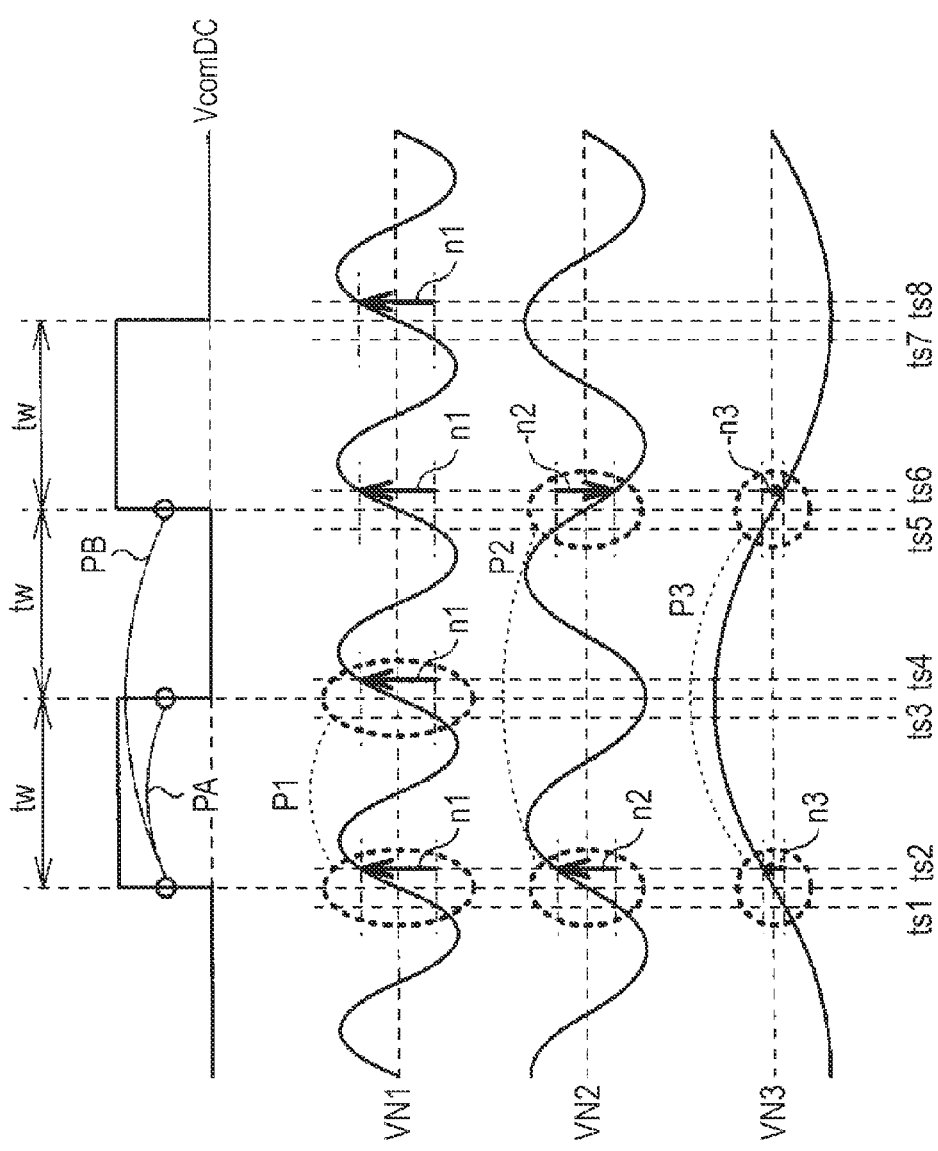

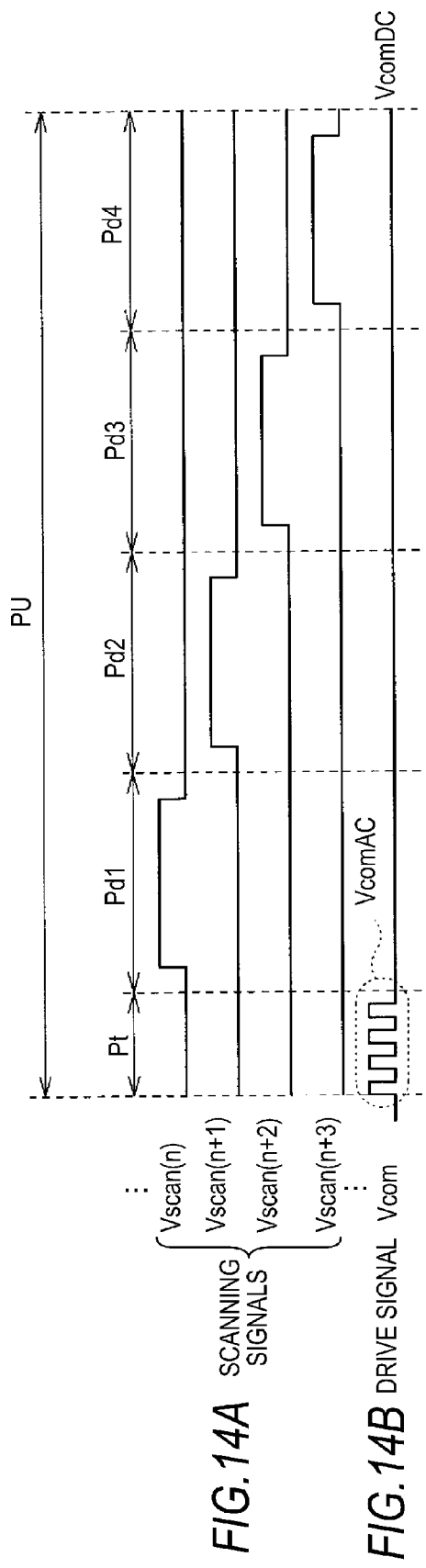

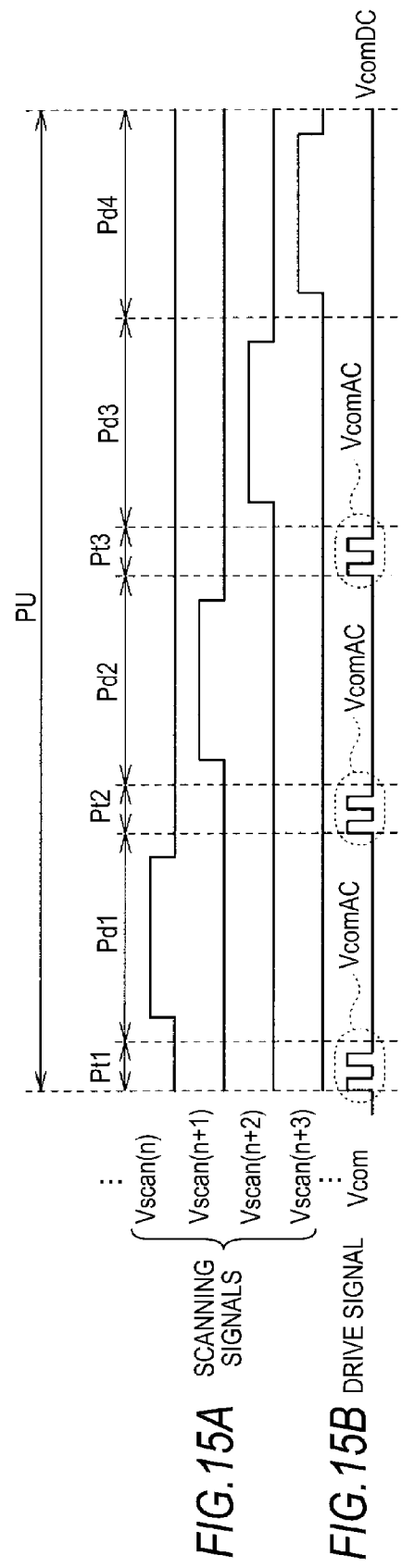

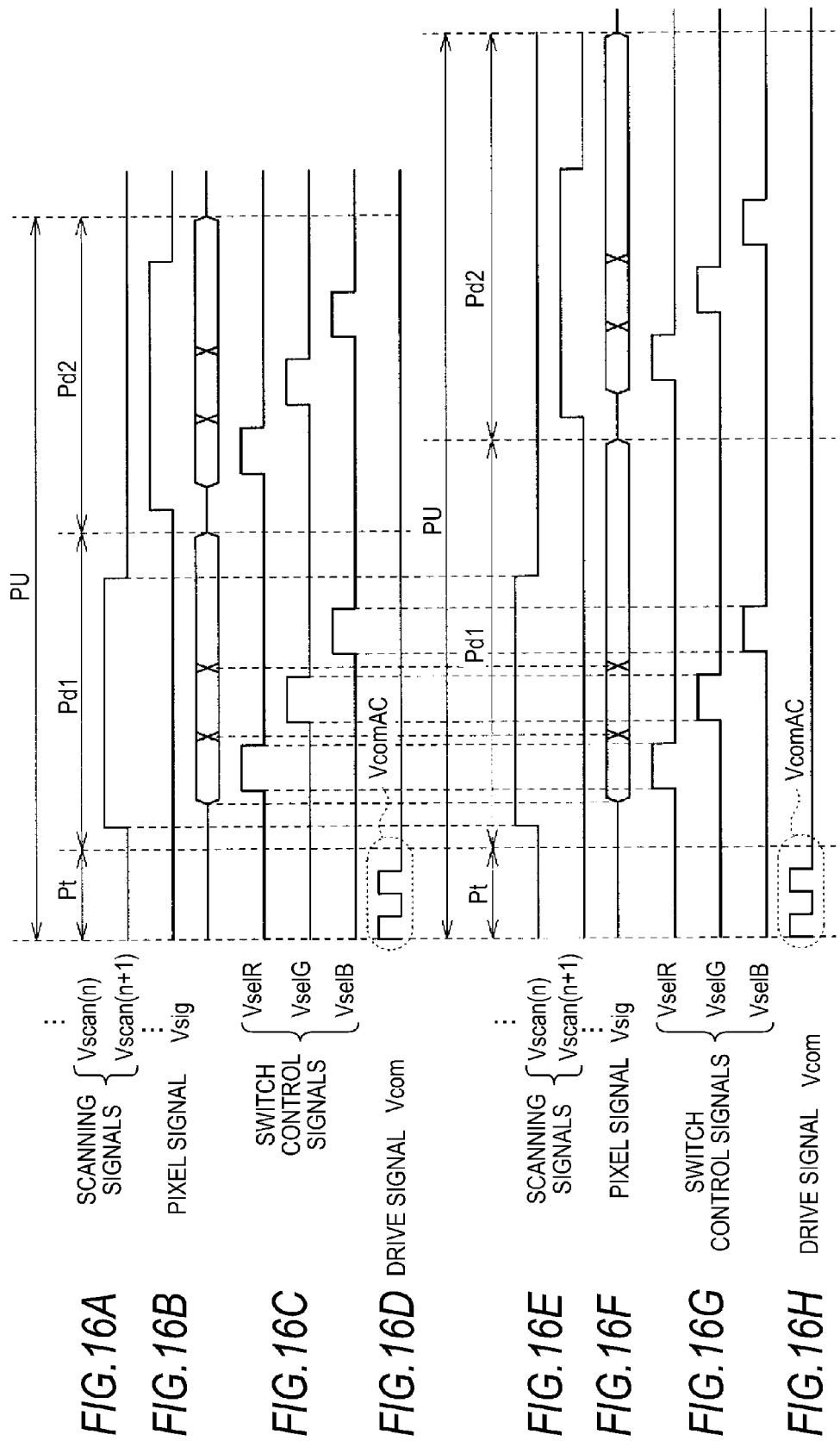

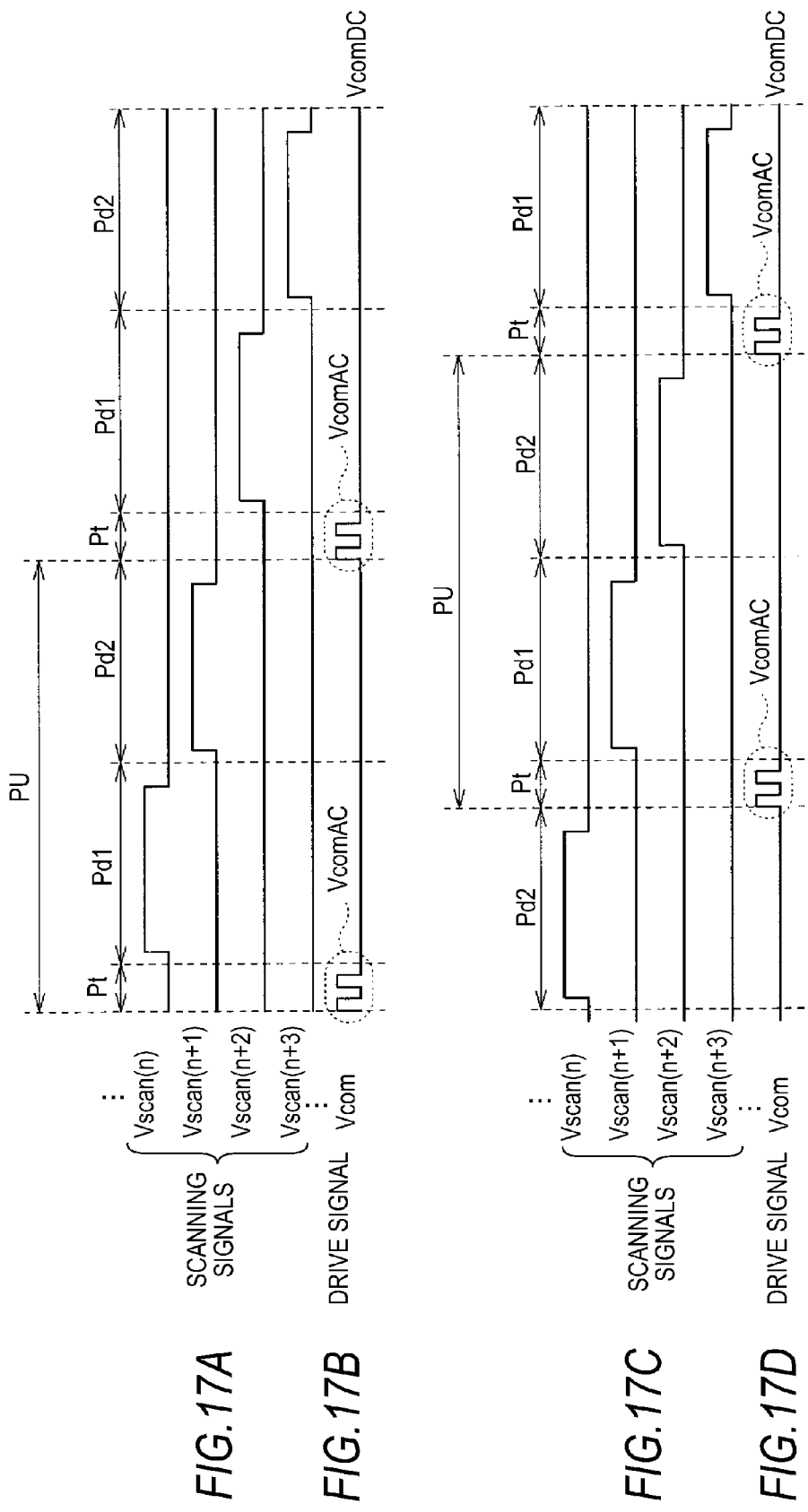

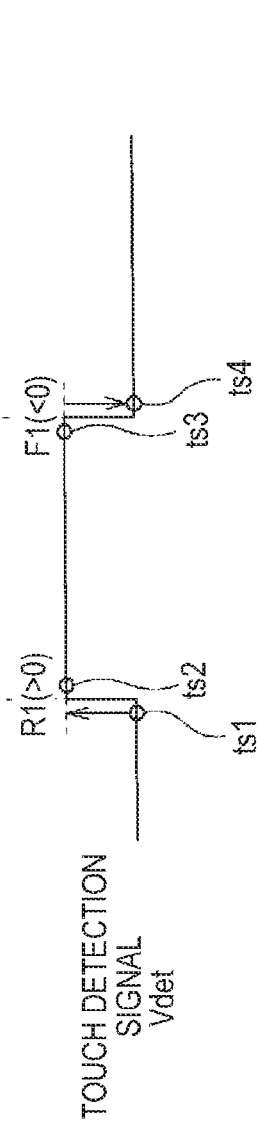
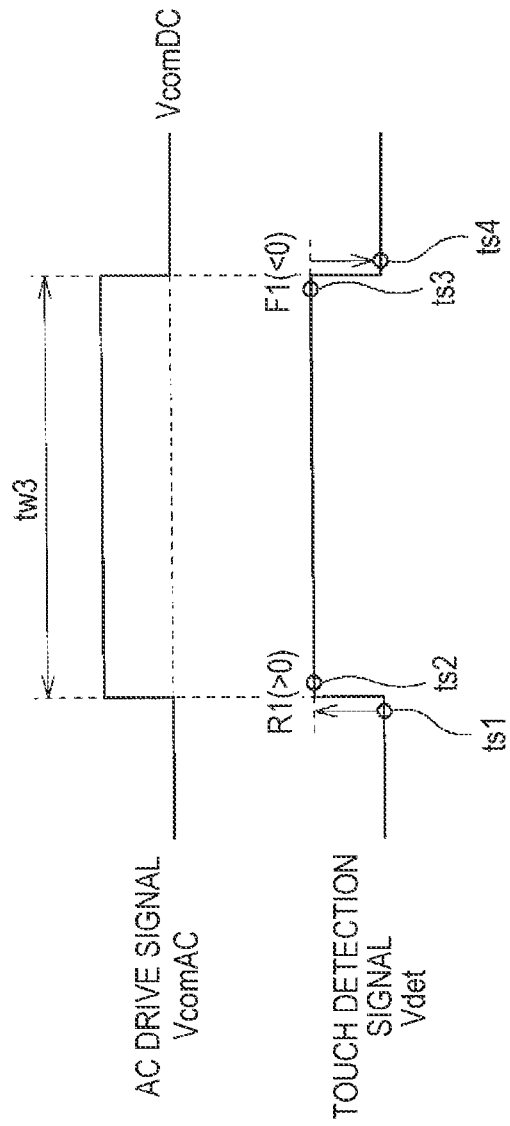

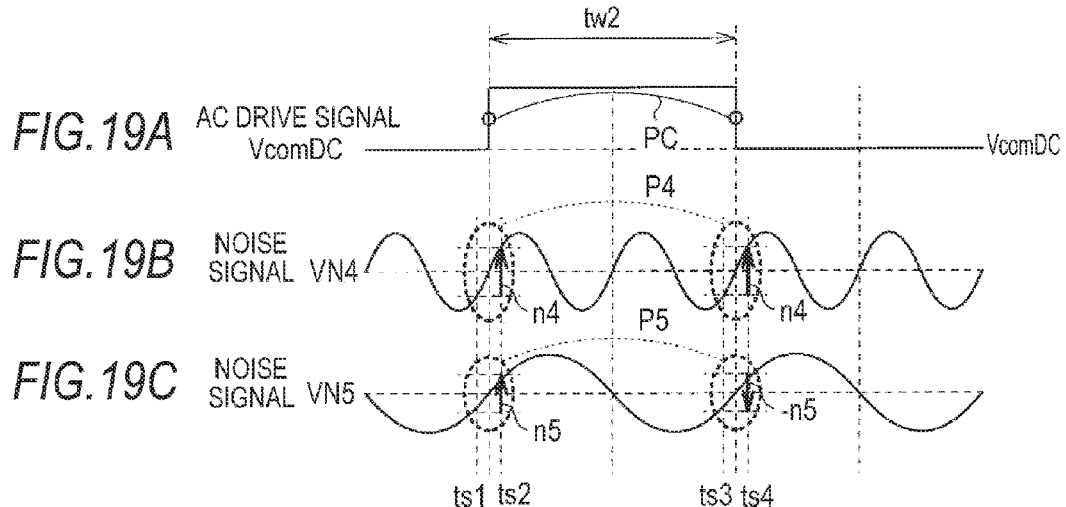
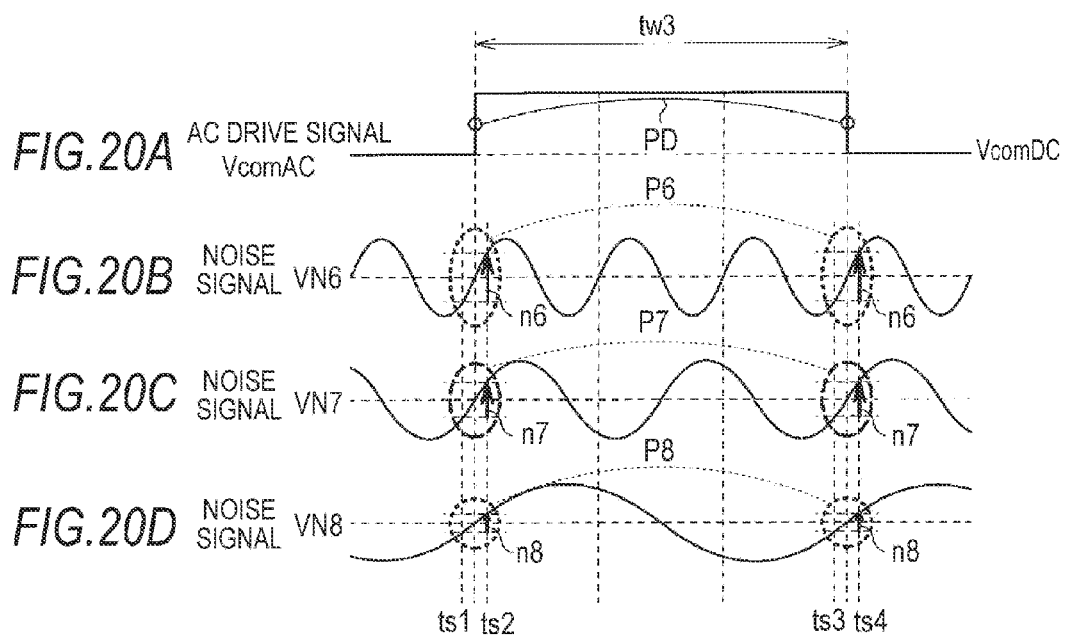

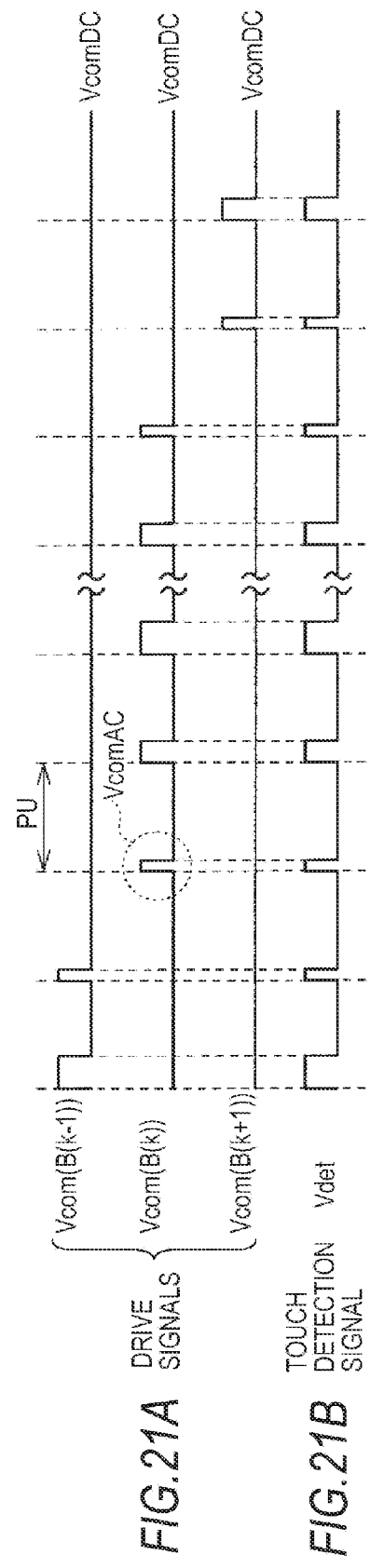

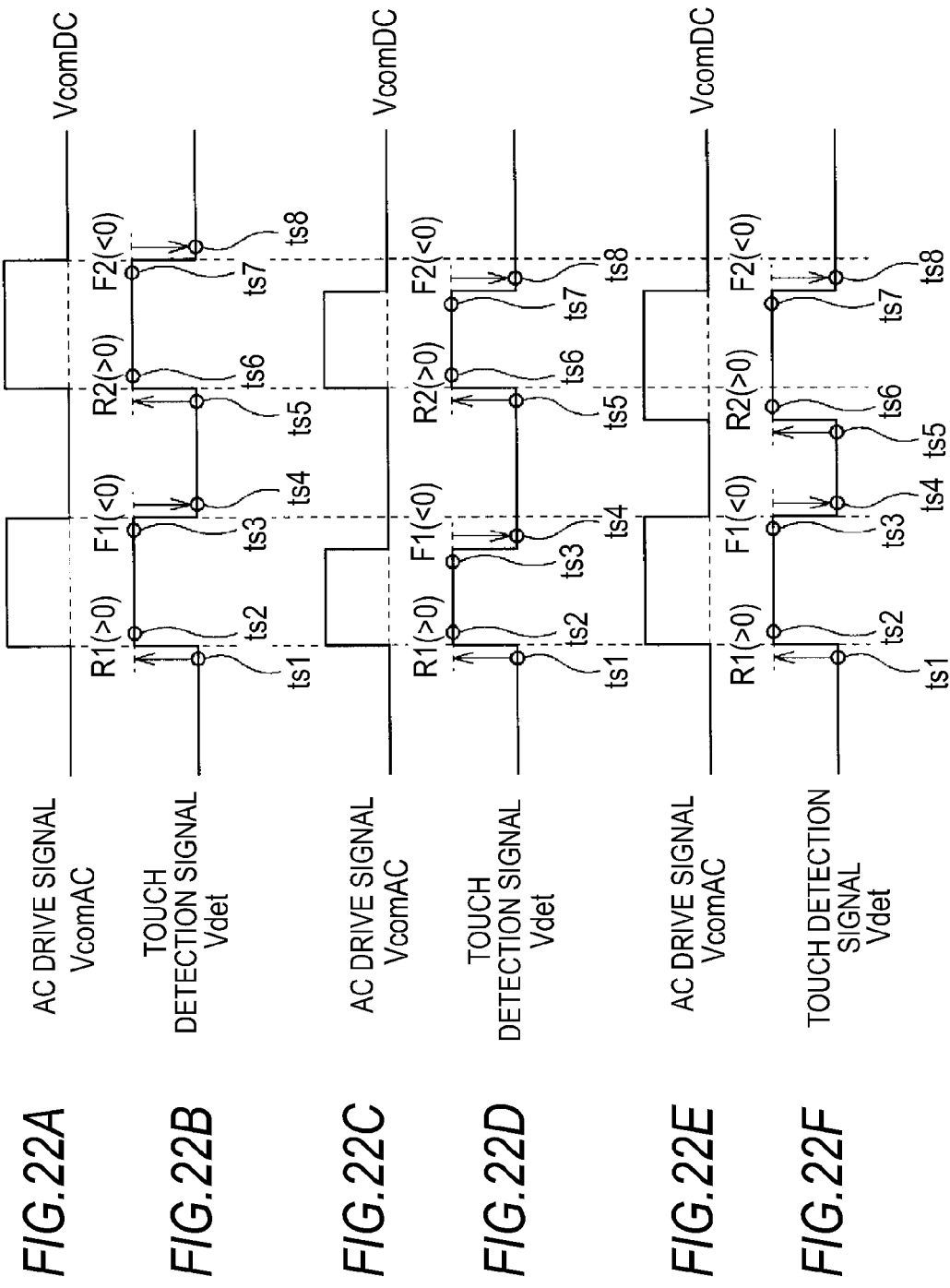

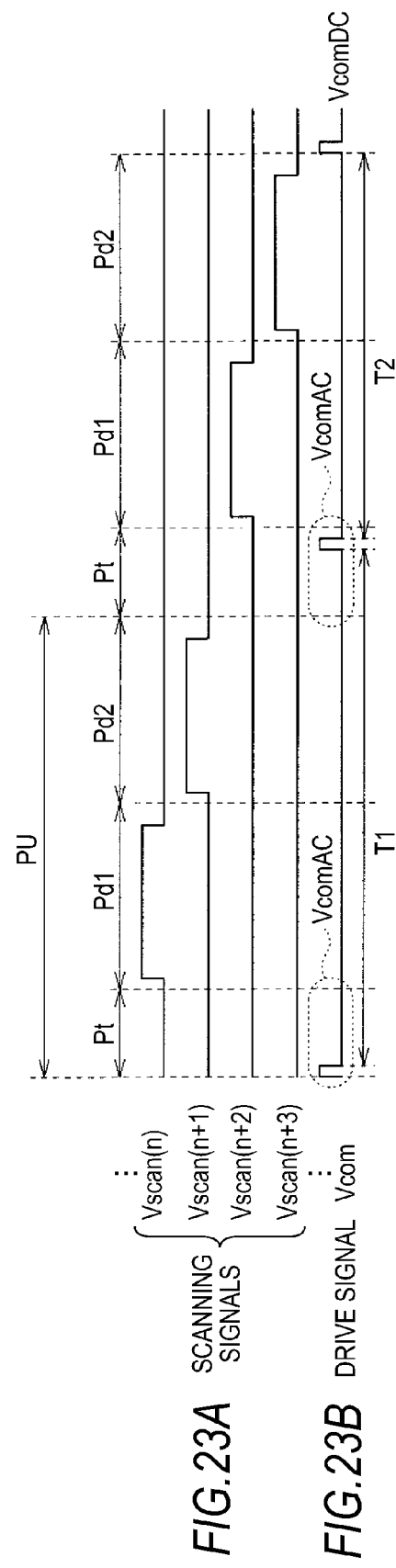

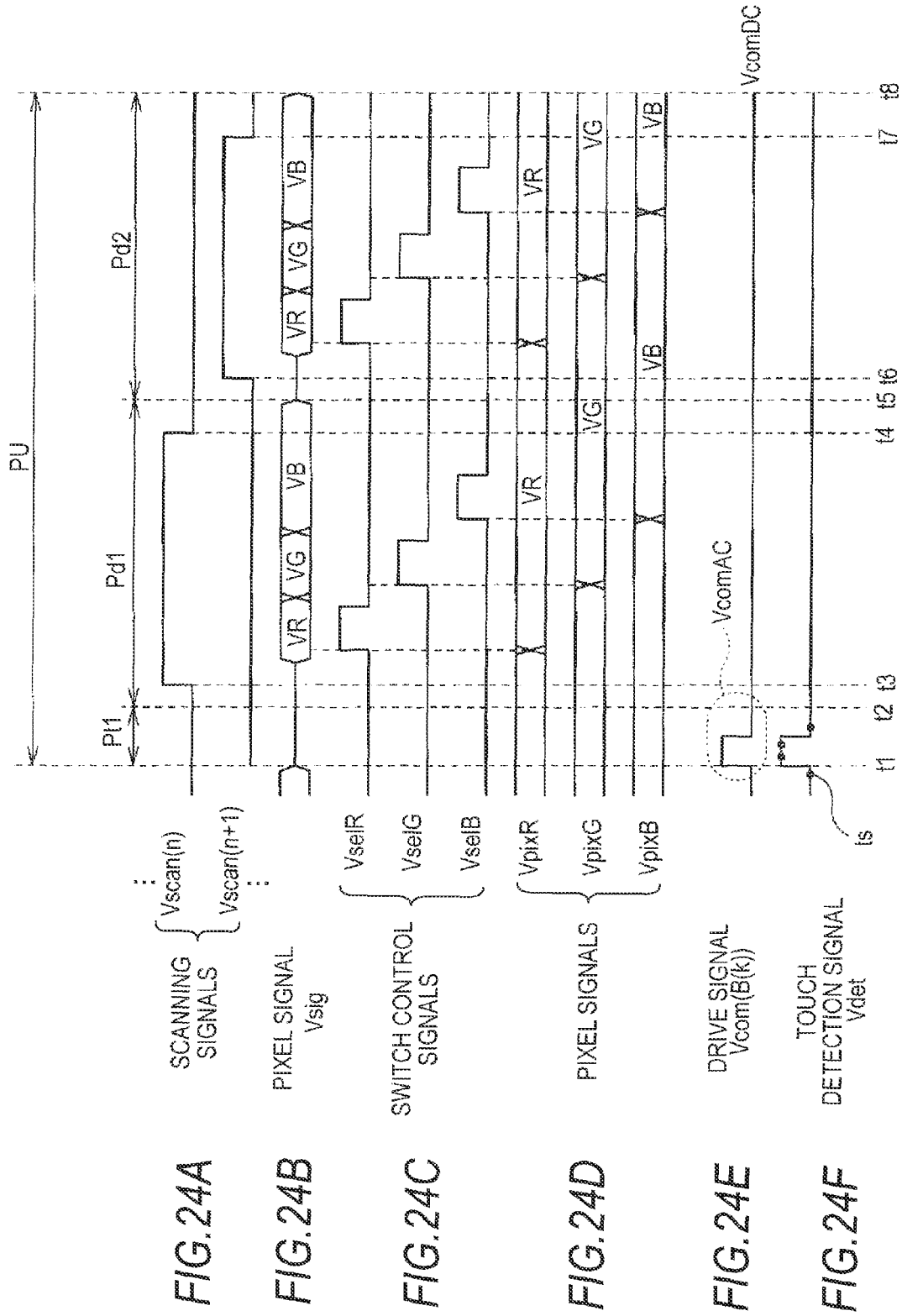

FIG.25
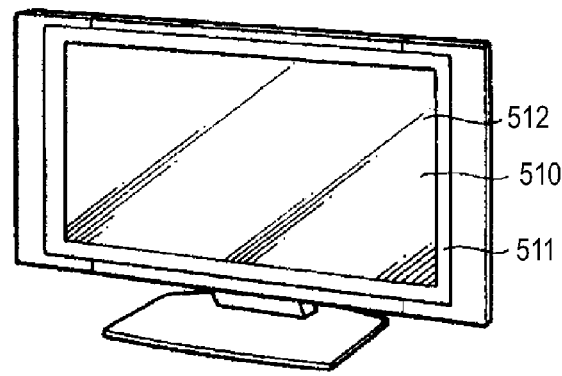
FIG.26A  FIG.26B  FIG.26C
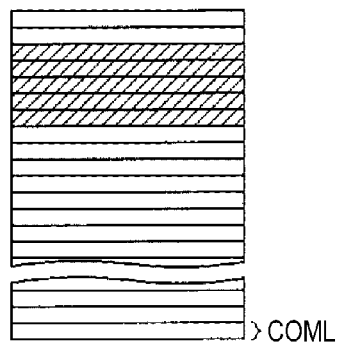 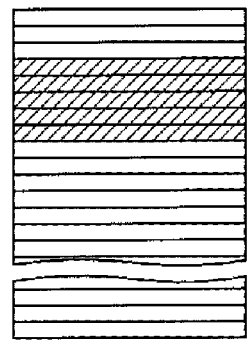 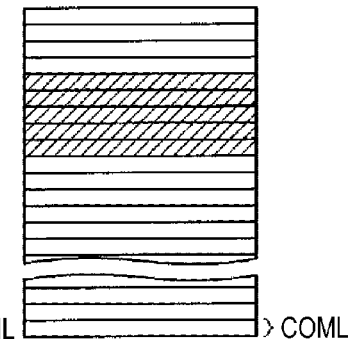
FIG.27A
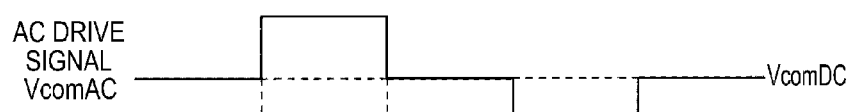
FIG.27B
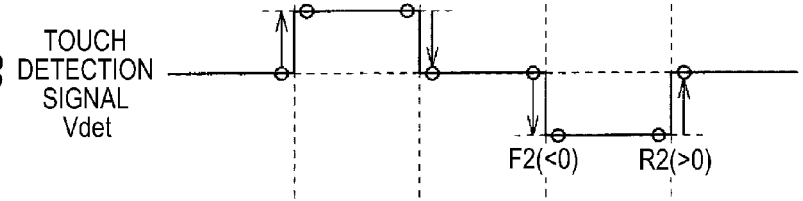

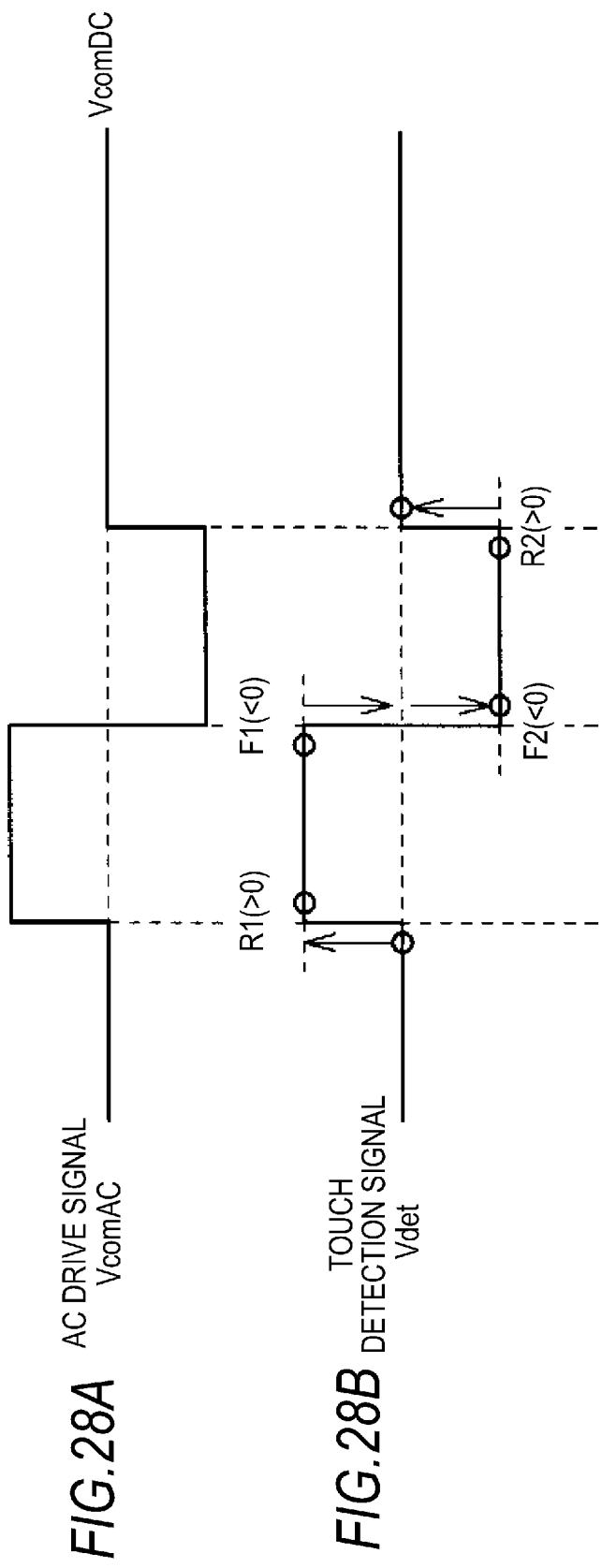

DISPLAY APPARATUS, DRIVE CIRCUIT, DRIVING METHOD AND ELECTRONIC APPARATUS

CROSS REFERENCES TO RELATED APPLICATIONS

The present application is a continuation of U.S. application Ser. No. 13/645,179, filed Oct. 4, 2012, which application claims priority to Japanese Priority Patent Application JP 2011-224536 filed in the Japan Patent Office on Oct. 12, 2011, the entire content of which is hereby incorporated by reference.

BACKGROUND

The present disclosure relates to a display apparatus having a touch detection function, a drive circuit, a driving method and an electronic apparatus having such display apparatus.

In recent years, a display apparatus attracts attention, in which a touch detection device which is a so-called touch panel is mounted on a display panel such as a liquid crystal display device or the touch panel and the display panel are integrated and various button images and the like are displayed on the display panel to thereby enable information input instead of normal mechanical buttons. As an input device such as a keyboard, a mouse or a keypad is not necessary in such display apparatus having the touch panel, the display apparatus tends to be widely used not only in a computer but also in portable information terminals such as a cellular phone.

There are some touch-panel systems such as an optical type and a resistive type, and a capacitance-type touch panel having a relatively simple structure as well as capable of realizing low-power consumption is requested. For example, there is proposed, in JP-2009-244958 (Patent Document 1), a display apparatus with a so-called in-cell type touch detection function in which a common electrode for display originally arranged in a display panel is also used as one of a pair of electrodes for a touch sensor, and the other electrode (touch detection electrode) is arranged so as to intersect with the common electrode. There are also proposed some so-called on-cell type display apparatuses with the touch detection function in which a touch panel is formed on a display surface of the display panel.

SUMMARY

There is a case in which, for example, display operation and touch detection operation are performed in synchronization with each other in the above display apparatus. In such case, there is a danger that the degree of freedom in the touch detection operation is reduced as the touch detection operation is constrained by the display operation.

In view of the above, it is desirable to provide a display apparatus, a drive circuit, a driving method and an electronic apparatus capable of increasing the degree of freedom in touch detection operation.

An embodiment of the present disclosure is directed to a display apparatus including a display device, a touch detection device, and a driver unit. The driver unit drives the display device so as to sequentially display M horizontal lines in each of plural unit drive periods forming one frame period and drives the touch detection device in N touch detection periods provided in each unit drive period, in which N is lower than M.

Another embodiment of the present disclosure is directed to a drive circuit including a driver unit driving the display device so as to sequentially display M horizontal lines in each of plural unit drive periods forming one frame period and driving the touch detection device in N touch detection periods provided in each unit drive period, in which N is lower than M.

Still another embodiment of the present disclosure is directed to a driving method including driving the display device so as to sequentially display M horizontal lines in each of plural unit drive periods forming one frame, and driving the touch detection device in N touch detection periods provided in each unit drive period, in which N is lower than M.

Yet another embodiment of the present disclosure is directed to an electronic apparatus including the display apparatus described above. The electronic apparatus corresponds to a television apparatus, a digital camera, a personal computer, a video camera, portable terminal devices such as a cellular phone, and the like.

In the display apparatus, the drive circuit, the driving method and the electronic apparatus according to the embodiments of the present disclosure, display driving with respect to M horizontal lines is sequentially performed in the unit drive period. In the operation, the touch detection device is driven in the N touch detection periods provided in the unit drive period, in which N is lower than M.

In the display apparatus, the drive circuit, the driving method and the electronic apparatus according to the embodiments of the present disclosure, the touch detection device is driven in the N touch detection periods provided in the unit drive period, in which N is lower than M, therefore, the degree of freedom in touch detection operation can be increased.

Additional features and advantages are described herein, and will be apparent from the following Detailed Description and the figures.

BRIEF DESCRIPTION OF THE FIGURES

FIGS. 1A and 1B are views for explaining basic principles of a touch detection system in a display panel according to an embodiment of the present disclosure, showing a state where a finger does not touch or does not come close to the display panel;

FIGS. 2A and 2B are views for explaining basic principles of the touch detection system in the display panel according to the embodiment of the present disclosure, showing a state where a finger touches or comes close to the display panel;

FIGS. 3A and 3B are views for explaining basic principles of the touch detection system in the display panel according to the embodiment of the present disclosure, showing an example of waveforms of a drive signal and a touch detection signal;

FIG. 4 is a block diagram showing a configuration example of the display panel according to the embodiment of the present disclosure;

FIG. 8 is a perspective view showing a structure example of drive electrodes and touch detection electrodes in the display device with the touch detection function shown in FIG. 4;

FIGS. 10A to 10F are timing charts showing an operation example of a display panel according to a first embodiment of the present disclosure;

FIGS. 11A and 11B are waveform charts showing waveform examples of an AC drive signal and a touch detection signal according to the first embodiment of the present disclosure;

FIGS. 12A and 12B are timing waveform charts showing touch detection scanning according to the first embodiment of the present disclosure;

FIGS. 13A to 13D are waveform charts showing an example of touch detection operation according to the first embodiment of the present disclosure;

FIGS. 14A and 14B are timing charts showing an operation example of a display panel according to a modification example of the first embodiment;

FIGS. 15A and 15B are timing charts showing an operation example of a display panel according to another modification example of the first embodiment;

FIGS. 16A to 16H are timing charts showing an operation example of a display panel according to further another modification example of the first embodiment;

FIGS. 17A to 17D are timing charts showing an operation example of a display panel according to further another modification example of the first embodiment;

FIGS. 18A to 18D are waveform charts showing waveform examples of AC drive signals and touch detection signals according to a second embodiment of the present disclosure;

FIGS. 19A to 19C are waveform charts showing an example of touch detection operation according to the second embodiment of the present disclosure;

FIGS. 20A to 20D are waveform charts showing another example of the touch detection operation according to the second embodiment of the present disclosure;

FIGS. 21A and 21B are timing waveform charts showing touch detection scanning according to a modification example of the second embodiment;

FIGS. 22A to 22F are waveform charts showing waveform examples of AC drive signals and touch detection signals according to a third embodiment of the present disclosure;

FIGS. 23A and 23B are timing charts showing an operation example of a display panel according to a fourth embodiment of the present disclosure;

FIGS. 24A to 24F are timing charts showing an operation example of a display panel according to a fifth embodiment of the present disclosure;

FIG. 25 is a perspective view showing an external structure of an application example of the display panel to which the embodiment is applied;

FIGS. 26A to 26C are schematic views showing an example of touch detection scanning in a display panel according to a modification example;

FIGS. 27A and 27B are waveform charts showing waveform examples of an AC drive signal and a touch detection signal according to another modification example; and FIGS. 28A and 28B are waveform charts showing waveform examples of an AC drive signal and a touch detection signal according to further another modification example.

DETAILED DESCRIPTION

Figure 5:
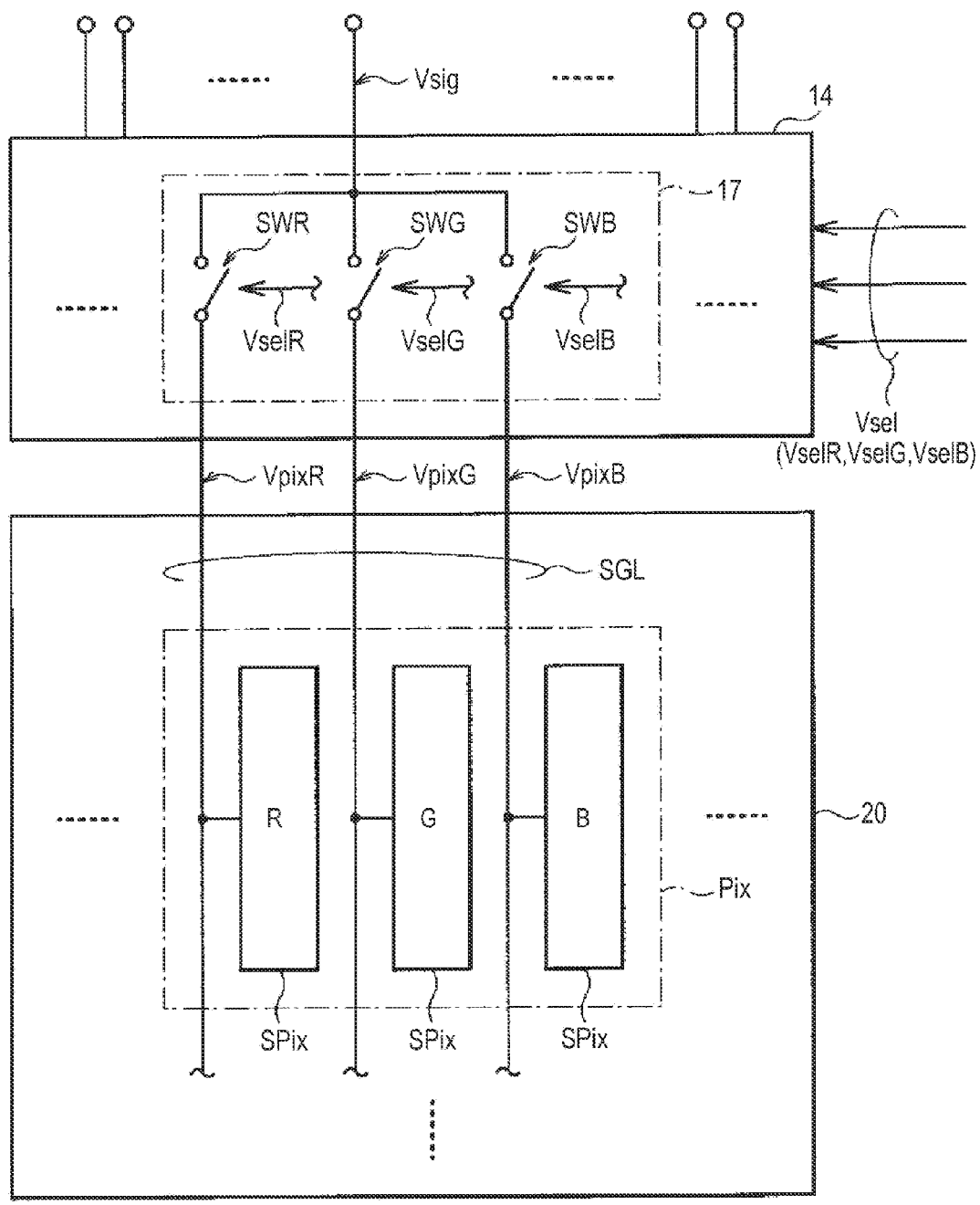
FIG. 5 is a block diagram showing a configuration example of a selection switch unit shown in FIG. 4.

Hereinafter, embodiments of the present disclosure are explained in detail with reference to the drawings. The explanation will be made in the following order.

1. Basic Principles of Capacitance-Type Touch Detection
2. First Embodiment
3. Second Embodiment
4. Third Embodiment
5. Fourth Embodiment
6. Fifth Embodiment
7. Application Examples <1. Basic Principles of Capacitance-Type Touch Detection>

First, basic principles of touch detection in a display panel according to an embodiment of the present disclosure will be explained with reference to FIGS. 1A to 3B. A touch detection system is embodied as a capacitance-type touch sensor, in which, for example as shown in FIG. 1A, a pair of electrodes (a drive electrode E1 and a touch detection electrode E2) arranged opposite to each other so as to sandwich a dielectric D are used to form a capacitor device. This structure is represented as an equivalent circuit shown in FIG. 1B. The drive electrode E1, the touch detection electrode E2 and the dielectric D configure a capacitor device C1. One terminal of the capacitor device C1 is connected to an AC signal source (drive signal source) S and the other terminal P is grounded through a resistor R as well as connected to a voltage detector (touch detection circuit) DET. When an AC rectangular wave Sg (FIG. 3B) of a given frequency (for example, approximately several kHz to several dozen kHz) is applied from the AC signal source S to the drive electrode E1 (one terminal of the capacitor device C1), an output waveform (touch detection signal Vdet) as shown in FIG. 3A appears at the touch detection electrode E2 (the other terminal P of the capacitor device C1). The AC rectangular wave Sg corresponds to an AC drive signal VcomAC which will be described later.

In a state where a finger does not touch (or is not close to) the sensor, a current I0 corresponding to a capacitance value of the capacitor device C1 flows with charge/discharge to the capacitor device C1 as shown in FIG. 1B. A potential waveform of the other terminal P of the capacitor device C1 at this time is, for example, as shown by a waveform V0 of FIG. 3A, which is detected by the voltage detector DET.

On the other hand, in a state where a finger touches (or is close to) the sensor, a capacitor device C2 formed by the finger is added to the capacitor device C1 in series as shown in FIG. 2B. In this state, currents I1 and I2 respectively flow with charge/discharge to the capacitor devices C1 and C2. A potential waveform of the other terminal P of the capacitor device C1 is, for example, as shown by a waveform V1 in FIG. 3A, which is detected by the detector DET. At this time, a potential of the point P is a divided potential fixed by values of the currents I1 and I2 flowing in the capacitor devices C1 and C2. Accordingly, the waveform V1 will be a lower value than the waveform V0 in the non-contact state. The voltage detector DET compares the detected voltage to a given threshold voltage Vth and determines the state as the non-contact state when the detected voltage is equal to or higher than the threshold voltage, whereas determines the state as the contact state when the detected voltage is lower than the threshold voltage. The touch detection can be performed in the above manner.

<2. First Embodiment>
[Configuration Example]
(Entire Configuration Example)

FIG. 4 shows a configuration example of a display panel according to an embodiment. A display panel 1 is a so-called in-cell type display apparatus in which a liquid crystal display panel and a capacitance-type touch panel are integrally formed.

The display panel 1 includes a control unit 11, a gate driver 12, a source driver 13, a selection switch unit 14, a drive electrode driver 16, a display device with a touch detection function 10 and a touch detection unit 40.

The control unit 11 is a circuit supplying control signals to the gate driver 12, the source driver 13, the drive electrode driver 16 and the touch detection unit 40 respectively based on a video signal Vdisp and controlling these units to operate in synchronization with one another. In the operation, the control unit 11 controls these circuits so that a touch detection period Pt is provided once every time a liquid crystal display device 20 of the display device with the touch detection function 10 displays horizontal lines of two rows as described later.

The gate driver 12 has a function of sequentially selecting one horizontal line to be a target of display driving in the display device with the touch detection function 10 based on the control signal supplied from the control unit 11. Specifically, the gate driver 12 applies a scanning signal Vscan to gates of TFT devices Tr of pixels Pix through scanning signal lines GCL to thereby sequentially select one row (one horizontal line) as a target of display driving in the pixels Pix formed in matrix in the liquid crystal display device 20 of the display device with the touch detection function 10 as described later.

The source driver 13 generates and outputs a pixel signal Vsig based on the video signal and the control signal supplied from the control unit 11. Specifically, the source driver 13 generates the pixel signal Vsig obtained by performing time-division multiplexing to pixel signals Vpix of plural (three in this case) sub-pixels SPix in the liquid crystal display device 20 of the display device with the touch detection function 10 from the video signal for one horizontal line and supplies the signal to the selection switch unit 14 as described later. The source driver 13 also has a function of generating switch control signals Vsel (VselR, VselG and VselB) necessary for separating the pixel signals Vpix multiplexed into the pixel signal Vsig and supplies the signals to the selection switch unit 14 with the pixel signal Vsig. The multiplexing is performed for reducing the number of wiring between the source driver 13 and the selection switch unit 14.

The selection switch 14 separates the pixel signals Vpix which have been time-division multiplexed into the pixel signal Vsig based on the pixel signal Vsig and the switch control signals Vsel supplied from the source driver 13 and supplies the signals to the liquid crystal display device 20 of the display device with the touch detection function 10.

FIG. 5 shows a configuration example of the selection switch unit 14. The selection switch unit 14 includes plural switch groups 17. Each switch group 17 has three switches SWR, SWG and SWB in this example, in which respective one of terminals are connected to one another and the pixel signal Vsig is supplied from the source driver 13, and in which the other terminals are connected to three sub-pixels SPix (R, G and B) relating to the pixel Pix respectively through the pixel signal lines SGL of the liquid crystal display device 20 of the display device with the touch detection function 10. The three switches SWR, SWG and SWB are respectively on/off controlled by the switch control signals Vsel (VselR, VselG and VselB) supplies from the source driver 13. According to the above function, the selection switch unit 14 sequentially changes over the three switches SWR, SWG and SWB in a time division manner to turn on these switches in accordance with the switch control signals Vsel, thereby functioning so as to separate the pixel signals Vpix (VpixR, VpixG and VpixB) from the multiplexed pixel signal Vsig. Then, the selection switch unit 14 supplies these pixel signals Vpix to the three sub-pixels SPix respectively.

The drive electrode driver 16 is a circuit supplying a drive signal Vcom to drive electrodes COML (described later) of the display device with the touch detection function 10 based on the control signal supplied from the control unit 11. Specifically, the drive electrode driver 16 applies a DC drive signal VcomDC to the drive electrodes COML in a display period Pd as described later. The drive electrode driver 16 also applies an AC drive signal VcomAC to the drive electrodes COML to be a target of touch detection operation in the touch detection period Pt and applies the DC drive signal VcomDC to the drive electrodes COML other than the target as described later. The AC drive signal VcomAC includes two pulses in this example. The drive electrode driver 16 drives the drive electrodes COML in units of blocks (later-described drive electrode blocks B) each including a given number of drive electrodes COML as described later.

The display device with the touch detection function 10 is a display device having the touch detection function. The display device with the touch detection function 10 has the liquid crystal display device 20 and a touch detection device 30. The liquid crystal display device 20 is a display device using a liquid crystal device LC (described later) as a display device, which is a device having resolution (960 pixels×540 pixels) of qHD (Quarter High Definition) in this example. The resolution is not limited to the resolution but other resolutions can be applied. The liquid crystal display device 20 is a device performing display by sequentially scanning horizontal lines one by one in accordance with the scanning signal Vscan supplied from the gate driver 12 as describe later. The touch detection device 30 operates based on the above-described basic principles of the capacitance-type touch detection and outputs the touch detection signal Vdet. The touch detection device 30 performs touch detection by performing sequential scanning in accordance with the AC drive signal VcomAC supplied from the drive electrode driver 16 as described later.

The touch detection unit 40 is a circuit detecting whether the touch detection device 30 has been touched or not based on the control signal supplied from the control unit 11 and the touch detection signal Vdet supplied from the touch detection device 30 of the display device with the touch detection function 10 and calculating coordinates in the touch detection area when the device has been touched. The touch detection unit 40 includes an LPF (Low Pass Filter) unit 42, an A/D converter 43, a signal processing unit 44, a coordinate extraction unit 45 and a detection timing control unit 46. The LPF unit 42 is a low-pass filter which removes high frequency components (noise components) included in the touch detection signal Vdet supplied from the touch detection device 30 and takes out touch components to thereby output these components respectively. Resistances R for giving DC potential (for example, 0V) are connected between respective input terminals and grounds. The A/D converter 43 is a circuit for sampling an analog signal outputted from the LPF unit 42 and converting the signal into a digital signal respectively at timings in synchronization with the AC drive signal VcomAC. The signal processing unit 44 is a logic circuit for detecting whether the touch detection device 30 has been touched or not based on the output signal of the A/D converter 43. The coordinate extraction unit 45 is a logic circuit for calculating coordinates in the touch panel when the touch has been detected in the signal processing unit 44. The detection timing control unit 46 has a function of controlling these circuits to operate in synchronization with one another.

(Display Device with Touch Detection Function 10)

Next, a configuration example of the display device with the touch detection function 10 will be explained in detail.

Figure 6:
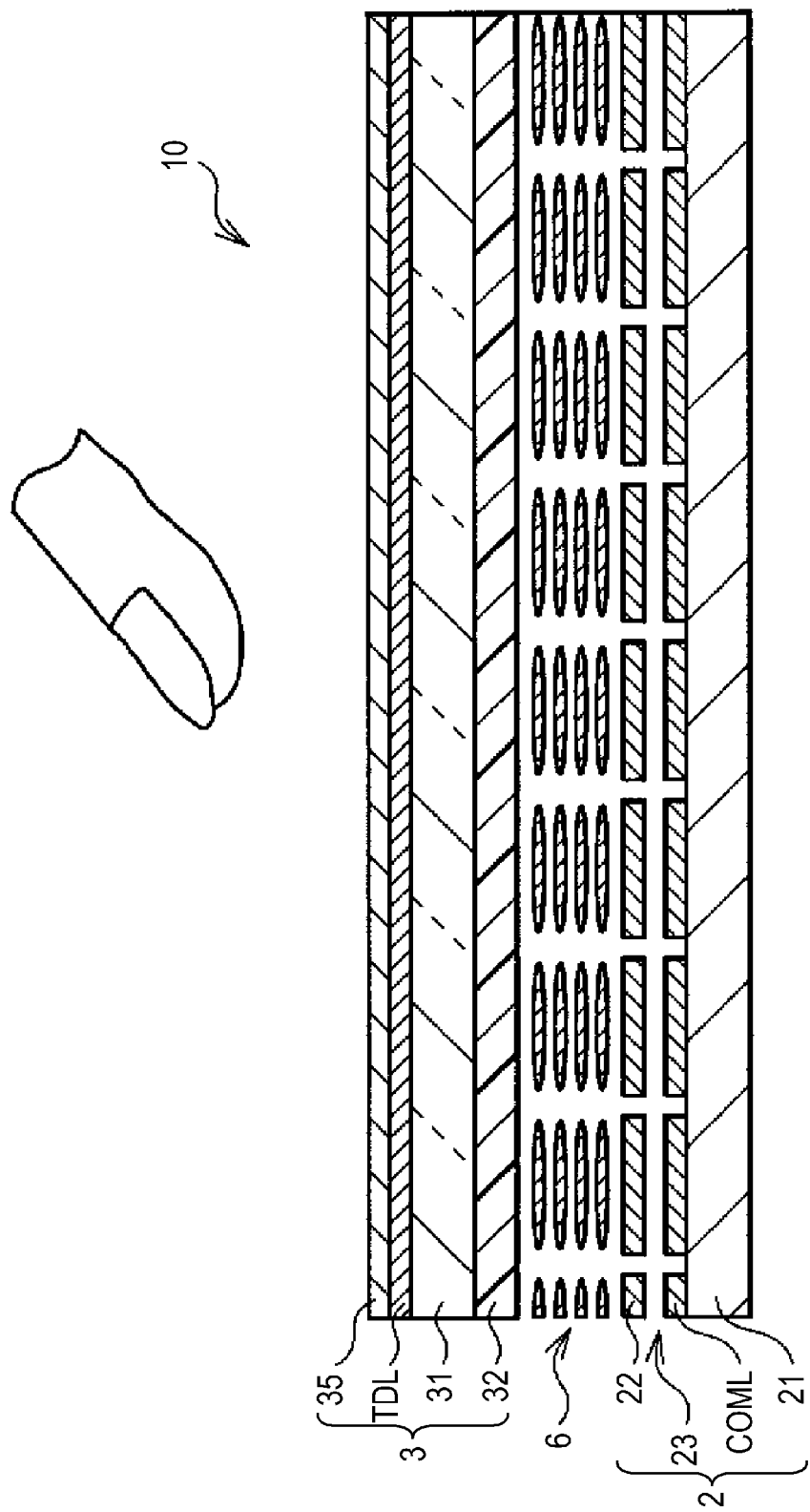
FIG. 6 is a cross-sectional view showing a schematic cross sectional structure of a display device with a touch detection function shown in FIG. 4.

FIG. 6 shows an example of a cross-sectional structure of a relevant part of the display device with the touch detection function 10. The display device with the touch detection function 10 includes a pixel substrate 2, a counter substrate 3 arranged opposite to the pixel substrate 2 and a liquid crystal layer 6 inserted between the pixel substrate 2 and the counter substrate 3.

The pixel substrate 2 includes a TFT substrate 21 as a circuit substrate, the drive electrodes COML and pixel electrodes 22. The TFT substrate 21 functions as the circuit substrate on which various types of electrodes and wiring, thin film transistors (TFT) and the like are formed. The TFT substrate 21 is made of, for example, glass. The drive electrodes COML are formed on the TFT substrate 21. The drive electrodes COML are electrodes for supplying a common voltage to plural pixels Pix (described later). The drive electrodes COML function as common drive electrodes for liquid crystal display operation as well as function as drive electrodes for touch detection operation. An insulating layer 23 is formed over the drive electrodes COML and the pixel electrodes 22 are formed thereon. The pixel electrodes 22 are electrodes for supplying the pixel signal Vpix, having transparency. The drive electrodes COML and the pixel electrodes 22 are made of, for example, ITO (Indium Tin Oxide).

The counter substrate 3 includes a glass substrate 31, color filters 32 and touch detection electrodes TDL. The color filters 32 are formed on one surface of the glass substrate 31. The color filters 32 are formed by regularly arranging, for example, three color filter layers of red (R), green (G) and blue (B), in which three colors of R, G and B are associated with each display pixel as a group. The touch detection electrodes TDL are formed on the other surface of the glass substrate 31. The touch detection electrodes TDL are electrodes made of, for example, ITO, having transparency. A polarizing plate 35 is arranged over the touch detection electrodes TDL.

The liquid crystal layer 6 functions as a display function layer, modulating light transmitting through the layer in accordance with a state of an electric field. The electric field is formed by a potential difference between a voltage of the drive electrodes COML and a voltage of the pixel electrodes 22. Lateral-electric field mode liquid crystal such as FFS (fringe field switching) or IPS (in-plane switching) is used for the liquid crystal layer 6.

Alignment films are arranged between the liquid crystal layer 6 and the pixel substrate 2 and between the liquid crystal layer 6 and the counter substrate 3, and further, an incident-side polarizing plate is arranged on the lower surface side of the pixel substrate 2, which are not shown here.

Figure 7:
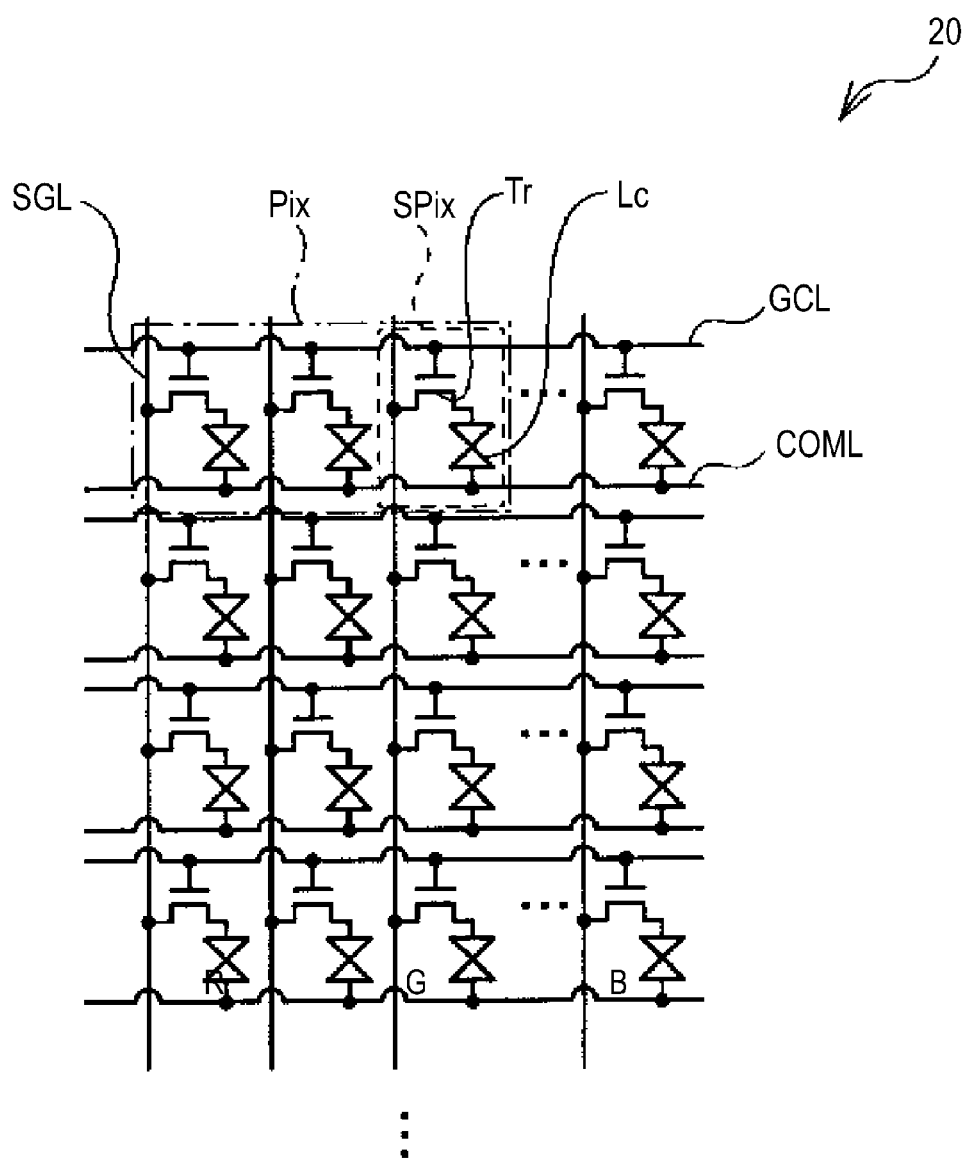
FIG. 7 is a circuit diagram showing pixel arrangement in the display device with the touch detection function shown in FIG. 4.

FIG. 7 shows a configuration example of a pixel structure in the liquid crystal display device 20. The liquid crystal display device 20 has plural pixels Pix arranged in matrix. Each pixel Pix includes three sub-pixels SPix. These sub-pixels SPix respectively correspond to three colors (RGB) of the color filters 32 shown in FIG. 6. Each sub-pixel includes a TFT device Tr and a liquid crystal device LC. The TFT device Tr is formed by a thin film transistor, which is an n-channel MOS (Metal Oxide Semiconductor) type TFT in this example. A source of the TFT device Tr is connected to a pixel signal line SGL, a gate is connected to a scanning signal line GCL and a drain is connected to one terminal of the liquid crystal device LC. The liquid crystal device LC is connected to the drain of the TFT device Tr at one terminal and is connected to the drive electrode COML at the other terminal.

The sub-pixel SPix is connected to other sub-pixels SPix belonging to the same row of the liquid crystal display device 20 to one another by the scanning signal line GCL. The scanning signal line GCL is connected to the gate driver 12 and the scanning signal Vscan is supplied from the gate driver 12. The sub-pixel SPix are also connected to other sub-pixels SPix belonging to the same column of the liquid crystal display device 20 to one another by the pixel signal line SGL. The pixel signal line SGL is connected to the selection switch unit 14 and the pixel signal Vpix is supplied from selection switch unit 14.

Moreover, the sub-pixel SPix is connected to other sub-pixels SPix belonging to the same row of the liquid crystal display device 20 to one another by the drive electrode COML. The driver electrode COML is connected to the drive electrode driver 16 and the drive signal Vcom (DC drive signal VcomDC) is supplied from the drive electrode driver 16.

According to the above configuration, one horizontal line is sequentially selected by driving the scanning signal lines GCL by the gate driver 12 so as to perform line-sequential scanning in the time division manner, and display is performed in units of horizontal lines by supplying the pixel signal Vpix to pixels Pix belonging to one horizontal line by the source driver 13 and the selection switch unit 14 in the liquid crystal display device 20.

FIG. 8 perspectively shows a configuration example of the touch detection device 30. The touch detection device 30 includes the drive electrodes COML provided in the pixel substrate 2 and the touch detection electrodes TDL provided in the counter substrate 3. The drive electrodes COML have a strip-shaped electrode pattern extending in a right and left direction of the drawing. When performing the touch detection operation, the AC drive signal VcomAC is sequentially supplied to respective electrodes in the pattern in units of blocks (later-described drive electrodes blocks B) each including the given number of drive electrodes COML and the scanning drive is sequentially performed in the time division manner as described later. The touch detection electrodes TDL have a strip-shaped electrode pattern extending in a direction orthogonal to the extending direction of the electrode pattern of the drive electrodes COML. Respective electrodes in the pattern of the touch detection electrodes TDL are respectively connected to inputs of the LPF unit 42 of the touch detection unit 40. In the electrode patterns of the drive electrodes COML and the touch detection electrode TDL intersecting each other, capacitance is formed at intersections.

According to the above structure, the AC drive signal VcomAC applied to the drive electrodes COML by the drive electrode driver 16 is transmitted to the touch detection electrodes TDL and outputted from the touch detection electrodes TDL as the touch detection signal Vdet in the touch detection device 30. That is, the drive electrodes COML correspond to the drive electrode E1 and the touch detection electrodes TDL correspond to the touch detection electrode E2 in the basic principles of touch detection shown in FIGS. 1A to 3B. The touch detection device 30 detects a touch in accordance with the basic principles. As shown in FIG. 8, the electrode patterns intersecting each other configure the capacitance-type touch sensors in a matrix form. Therefore, scanning is performed over the entire touch detection surface of the touch detection device 30, thereby detecting a position where an external near-field object touches or comes close to the sensor.

The drive electrode driver 16 performs the touch detection scanning by driving the drive electrodes COML in units of blocks each including the given number of drive electrodes COML (drive electrode blocks B).

Figure 9A:
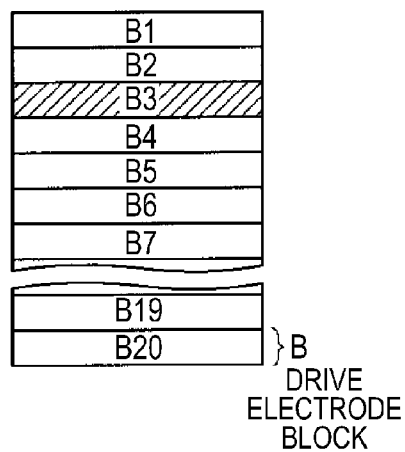
FIGS. 9A to 9C are schematic views showing an example of touch detection scanning in the display panel shown in FIG. 4.
Figure 9B:
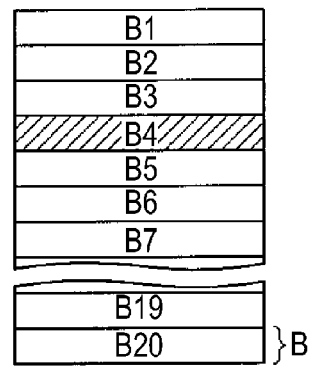
Figure 9C:
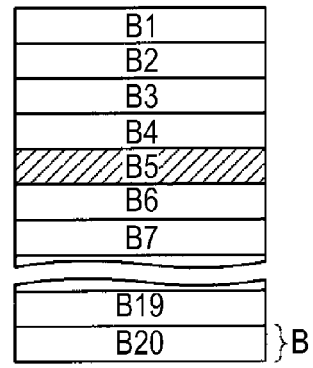

FIGS. 9A to 9C schematically show the touch detection scanning. In FIGS. 9A to 9C, supply operation of the AC drive signal VcomAC to respective drive electrode blocks B1 to B20 in the case where the touch detection surface includes 20 pieces of drive electrode blocks B1 to B20 are shown. In FIGS. 9A to 9C, shaded drive electrode blocks B represent that the AC drive signal VcomAC is supplied, and other drive electrode blocks B represent that the DC drive signal VcomDC is supplied.

The drive electrode driver 16 applies the drive signal VcomAC to the drive electrodes COML in units of the drive electrode blocks B. Each drive electrode block B is set to a width corresponding to, for example, the size of a user's finger (for example, approximately 5 mm) The drive electrode driver 16 sequentially selects the drive electrode blocks B to be targets of the touch detection operation and applies the AC drive signal VcomAC to the drive electrodes COML belonging to the drive electrode block B, thereby scanning the electrodes all over the drive electrode blocks B. The number of the drive electrode blocks B is 20 in the example for convenience of explanation, however, the present disclosure is not limited to the example.

[Operation and Effect]

Subsequently, operation and effect of the display panel 1 according to the embodiment will be explained.

(Whole Operation Summary)

First, the whole operation summary of the display panel 1 will be explained with reference to FIG. 4. The control unit 11 respectively supplies control signals to the gate driver 12, the source driver 13, the drive electrode driver 16 and the touch detection unit 40 based on the video signal Vdisp and controls these units to operate in synchronization with one another. In the operation, the control unit 11 controls these circuits so that the touch detection period Pt is provided once every time the liquid crystal display device 20 of the display device with the touch detection function 10 displays the horizontal lines of two rows.

The gate driver 12 supplies the scanning signal Vscan to the liquid crystal display device 20 and sequentially selects one horizontal line to be a target of display driving. The source driver 13 generates the pixel signal Vsig obtained by multiplexing the pixel signals Vpix and the corresponding switch control signals Vsel and supplies the signals to the selection switch unit 14. The selection switch unit 14 separates and generates the pixel signals Vpix based on the pixel signal Vsig and the switch control signals Vsel, supplying the pixel signals Vpix to respective pixels Pix included in one horizontal line. The drive electrode driver 16 applies the DC drive signal VcomDC to all the drive electrodes COML in the display period Pd. The drive electrode driver 16 also applies the AC drive signal VcomAC to the drive electrodes COML belonging to the drive electrode block B to be a target of the touch detection operation as well as applies the DC drive signal VcomDC to the drive electrodes COML other than the target. The display device with the touch detection function 10 performs display operation in the display period Pd as well as performs touch detection operation in the touch detection period Pt, outputting the touch detection signal Vdet from the touch detection electrodes TDL.

The touch detection unit 40 detects a touch on the touch detection surface based on the touch detection signal Vdet. Specifically, the LPF unit 42 removes high frequency components included in the touch detection signal Vdet and takes out touch components to thereby output these components. The A/D converter 43 converts the analog signal outputted from the LPF unit 42 into the digital signal. The signal processing unit 44 detects whether the touch detection surface has been touched or not based on the output signal of the A/D converter 43. The coordinate extraction unit 45 calculates coordinates in the touch panel when the touch has been detected in the signal processing unit 44. The detection timing control unit 46 controls the LPF unit 42, the A/D converter 43, the signal processing unit 44 and the coordinate extraction unit 45 to operate in synchronization with one another.

(Detailed Operation)

Next, the operation of the display panel 1 will be explained in detail with reference to some drawings.

FIGS. 10A to 10F show an example of timing waveforms of the display panel 1, in which FIG. 10A shows a waveform of the scanning signal Vscan, FIG. 10B shows a waveform of the pixel signal Vsig, FIG. 10C shows waveforms of the switch control signals Vsel, FIG. 10D shows waveforms of the pixel signal Vpix, FIG. 10E shows a waveform of the drive signals Vcom and FIG. 10F shows a waveform of the touch detection signal Vdet.

In the display panel 1, the display operation and the touch detection operation are performed in each unit drive period PU which is provided repeatedly. In the unit drive period PU, there are provided the touch detection period Pt during which the touch detection operation is performed and two display periods Pd1, Pd2 during which the display operation with respect to a horizontal line of one row is performed respectively. In the display operation, the gate driver 12 sequentially applies the scanning signal Vscan to the scanning signal lines GCL to thereby perform display scanning. In the touch detection operation, the drive electrode driver 16 sequentially applies the AC drive signal VcomAC in units of the drive electrode blocks B to thereby perform the touch detection scanning and the touch detection unit 40 detects a touch based on the touch detection signal Vdet outputted from the touch detection electrodes TDL. The details of the above will be explained below.

First, the unit drive period PU starts and a touch detection period Pt starts at a timing "t1".

The drive electrode 16 applies the AC drive signal VcomAC to the drive electrodes COML and the touch detection unit 40 performs touch detection based on the touch detection signal Vdet in a period from the timing "t1" to a timing "t2" (touch detection period Pt). Specifically, the drive electrode driver 16 applies the AC drive signal VcomAC to the drive electrodes COML included in the k-th drive electrode block B(k) relating to the touch detection operation in the touch detection period Pt (FIG. 10E). The AC drive signal VcomAC is transmitted to the touch detection electrodes TDL through capacitance, and the touch detection signal Vdet is changed (FIG. 10F). Then, the touch detection unit 40 performs touch detection based on the touch detection signal Vdet.

Next, the touch detection period Pt ends and the first display period Pd1 starts at the timing "t2". In the display period Pd1, the display operation with respect to the n-th horizontal line is performed.

In the display period Pd1, the gate driver 12 applies the scanning signal Vscan to the n-th scanning signal GCL(n) relating to the display operation at a timing "t3", and the scanning signal Vscan(n) is changed from a low level to a high level (FIG. 10A). Accordingly, the gate driver 12 selects the n-th horizontal line to be a target of the display operation.

Then, the source driver 13 supplies a pixel voltage VR for a red sub-pixel SPix to the selection switch unit 14 as the pixel signal Vsig (FIG. 10B) as well as generates the switch control signal VselR to be in the high level in a period during which the pixel voltage VR is supplied (FIG. 10C). Then, the selection switch unit 14 turns on the switch SWR in the period during which the switch control signal VselR is in the high level, thereby separating the pixel voltage VR supplied from the source driver 13 from the pixel signal Vsig and supplies the signal to the red sub-pixel SPix through the pixel signal line SGL as the pixel signal VpixR (FIG. 10D). As the pixel signal line SGL is in a floating state after the switch SWR is turned off, the voltage of the pixel signal line SGL is maintained (FIG. 10D).

Similarly, the source driver 13 supplies a pixel voltage VG for the green sub-pixel SPix to the selection switch unit 14 with the corresponding switch signal VselG (FIG. 10B), and the selection switch unit 14 separates the pixel voltage VG from the pixel signal Vsig based on the switch control signal VselG and supplies the signal to the green sub-pixel SPix through the pixel signal line SGL as the pixel signal VpixG (FIG. 10D).

Subsequently, in a similar manner, the source driver 13 supplies a pixel voltage VB for the blue sub-pixel SPix to the selection switch unit 14 with the corresponding switch control signal VselB (FIGS. 10B and 10C), and the selection switch unit 14 separates the pixel voltage VB from the pixel signal Vsig based on the switch control signal VselB and supplies the signal to the blue sub-pixel SPix through the signal line SGL as the pixel signal VpixB (FIG. 10D).

Next, the gate driver 12 changes the scanning signal Vscan (n) of the n-th scanning signal line GCL from the high level to the low level at a timing "t4" (FIG. 10A). Accordingly, the sub-pixels Spix in one horizontal line relating to the display operation are electrically separated from the pixel signal lines SGL.

Then, the first display period Pd1 ends as well as the second display period Pd2 starts at a timing "t5". In the display period Pd2, the display operation with respect to the (n+1)-th horizontal line is performed in the same manner as the display period Pd1.

In the display period Pd2, the gate driver 12 applies the scanning signal Vscan to the (n+1)-th scanning signal line GCL(n+1) relating to the display operation at a timing "t6", and the scanning signal Vscan(n+1) is changed from a low level to a high level (FIG. 10A). Accordingly, the gate driver 12 selects the (n+1)-th horizontal line to be a target of the display operation.

Then, the source driver 13 supplies the pixel voltage VR for the red sub-pixel Spix to the selection switch unit 14 with the corresponding switch control signal VselR (FIGS. 10B and 10C), and the selection switch unit 14 separates the pixel voltage VR from the pixel signal Vsig based on the switch control signal VselR and supplies the signal to the red sub-pixel SPix through the pixel signal line SGL as the pixel signal VpixR (FIG. 10D). Similarly, the source driver 13 supplies the pixel signal VpixG to the green sub-pixel SPix and supplies the pixel signal VpixB to the blue sub-pixel SPix (FIG. 10D).

Next, the gate driver 12 changes the scanning signal Vscan (n+1) of the (n+1)-th scanning signal line GCL from the high level to the low level at a timing "t7" (FIG. 10A). Accordingly, the sub-pixels Spix in one horizontal line relating to the display operation are electrically separated from the pixel signal lines SGL.

Then, the second display period Pd2 ends as well as the unit drive period PU ends at a timing "t8", then, a new unit drive period PU subsequently starts.

As the above operation is continuously repeated, the display operation in the entire display surface is performed by line-sequential scanning as well as the touch detection operation in the entire touch detection surface is performed by scanning the touch detection surface in units of the drive electrode blocks B as described below in the display panel 1.

(Touch Detection Operation)

Next, the touch detection operation will be explained in detail.

FIG. 11A shows a waveform of the AC drive signal VcomAC and FIG. 11B shows a waveform of the touch detection signal Vdet. The AC drive signal VcomAC has two pulses. A pulse width and a pulse interval of these two pulses are set to time periods tw which are equivalent to each other. The time period tw is, for example, 2 [usec]. When the AC drive signal VcomAC is transmitted to the touch detection electrodes TDL through capacitance, the touch detection signal Vdet shown in FIG. 11B is generated.

The A/D converter 43 of the touch detection unit 40 performs A/D conversion of the output signal of the LPF unit 42 to which the touch detection signal Vdet is inputted at timings before and after respective transitions of the AC drive signal VcomAC (sampling timings ts1 to ts8) (FIG. 11B) to calculate data D (ts1) to Data D(ts8).

Then, the signal processing unit 44 of the touch detection unit 40 calculates variations R1 (=D(ts2)−D(ts1)), F1 (=D (ts4)−D(ts3)), R2 (=D(ts6)−D(ts5)) and F2 (=D(ts8)−D(ts7)) of the touch detection signal Vdet in respective transitions based on these data D(ts1) to D(ts8). That is, variations R1 and R2 have positive values (R1, R2>0) and variations F1 and F2 have negative values (F1, F2<0).

Next, the signal processing unit 44 calculates detection data DD in the touch detection period Pt by using the following expression based on these variations R1, F1, R2 and F2.

$$DD=R1-F1+R2-F2 \qquad (1)$$

The signal processing unit 44 collects the detection data DD in plural unit drive periods PU (plural touch detection periods Pt) and performs touch detection based on the detection data DD as explained below.

FIGS. 12A and 12B show an operation example of touch detection scanning, in which FIG. 12A shows a waveform of the drive signal Vcom and FIG. 12B shows a waveform of the touch detection signal Vdet.

The drive electrode driver 16 performs touch detection scanning by sequentially applying the AC drive signal VcomAC to the drive electrodes COML in units of the drive electrode blocks B as shown in FIGS. 12A and 12B. In the operation, the drive electrode driver 16 applies the AC drive signal VcomAC with respect to respective drive electrode blocks B over the given plural (for example, 30 pieces) unit drive periods PU (FIG. 12A). The touch detection unit 40 samples the touch detection signal Vdet based on the AC drive signal VcomAC and calculates the detection data DD in each unit drive period PU. Then, the signal processing unit 44 averages 30 pieces of detection data DD, for example, by a FIR (Finite Impulse Response) filter with 30 taps to detect whether an area corresponding to the drive electrode block B has been touched or not. As the touch detection is performed based on plural sampling results as described above, the sampling results can be statistically analyzed, which can suppress reduction of the S/N ratio due to variations in sampling results and can increase the accuracy of touch detection.

(Prevention of Malfunction in Touch Detection Operation)

There is a danger that noise (disturbance noise) due to an inverter fluorescent lamp, AM radio waves, an AC power supply and so on propagates through the touch panel to cause malfunction in the capacitance-type touch panel. The malfunction is due to the fact that it is difficult to distinguish between the signal relating to contact/non-contact (touch signal) and the disturbance noise. It is possible to suppress the malfunction in the display panel 1 as the AC drive signal VcomAC includes two pulses. The details will be explained below.

FIGS. 13A to 13D schematically show sampling operations when disturbance noise is applied, in which FIG. 13A shows a waveform of the AC drive signal VcomAC and FIG. 13B to 13D respectively show examples of noise signals to be superimposed on the touch detection signal Vdet due to the disturbance noise.

First, a case of a noise signal VN1 shown in FIG. 13B will be explained. The noise signal VN1 is a signal with a cycle of the time period "tw", and a frequency thereof is 500 [kHz] when the time period "tw" is 2 [usec].

As shown in FIG. 13B, the noise signal VN1 changes with the same variation (noise n1) before and after respective transitions of the AC drive signal VcomAC. Therefore, when the noise signal VN1 is superimposed on the touch detection signal Vdet, the detection data DD is represented by the following expression.

$$DD = (R1 + n1) - (F1 + n1) + (R2 + n1) - (F2 + n1) \quad (2)$$
$$= R1 - F1 + R2 - F2$$

That is, for example, the noise n1 relating to a rising edge of the first pulse of the AC drive signal VcomAC and the noise n1 relating to a falling edge cancel each other out, and the noise n1 relating to the rising edge of the second pulse of the AC drive signal VcomAC and the noise n1 relating to the falling edge cancel each other out, therefore, the noise n1 does not appear in the detection data DD as shown in the expression (2). In other words, as the noises n1 (a pair P1) having the same polarity are generated at a transition timing pair PA having reverse polarities in the AC drive signal VcomAC in the noise signal VN1, the noises cancel each other out. Therefore, the noise signal VN1 does not affect the touch detection operation.

In the noise signals having integral multiple frequencies of the noise signal VN1, noises are also cancelled out due to the same principles, which do not affect the touch detection operation.

Next, a case of a noise signal VN2 shown in FIG. 13C will be explained. The noise signal VN2 is a signal with a cycle of ⅔ times of the time period "tw", and a frequency thereof is 375 [kHz] when the time period "tw" is 2 [usec].

As shown in FIG. 13C, the noise signal VN2 changes with a variation of a noise n2 before and after the rising edge of the first pulse of the AC drive signal VcomAC and changes with a variation of a noise (-n2) before and after the rising edge of the second pulse. Therefore, when the noise signal VN2 is superimposed on the touch detection signal Vdet, the detection data DD is represented by the following expression.

$$DD = (R1 + n2) - F1 + (R2 - n2) - F2 \quad (3)$$
$$= R1 - F1 + R2 - F2$$

That is, as the noise n2 relating to the rising edge of the first pulse of the AC drive signal VcomAC and the noise (-n2) relating to the rising edge of the second pulse of the AC drive signal VcomAC cancel each other out in this example, the noise n2 does not appear in the detection data DD as shown in the expression (3). In other words, as the noises n2 and -n2 (a pair P2) having reverse polarities are generated at a transition timing pair PB having the same polarity in the AC drive signal VcomAC in the noise signal VN2, the noises cancel each other out. Therefore, the noise signal VN2 does not affect the touch detection operation.

Next, a case of a noise signal VN3 shown in FIG. 13D will be explained. The noise signal VN3 is a signal with a cycle of 4 times of the time period "tw", and a frequency thereof is 125 [kHz] when the time period "tw" is 2 [usec].

As shown in FIG. 13D, the noise signal VN3 changes with a variation of a noise n3 before and after the rising edge of the first pulse of the AC drive signal VcomAC and changes with a variation of a noise (-n3) before and after the rising edge of the second pulse. Therefore, when the noise signal VN3 is superimposed on the touch detection signal Vdet, the detection data DD is represented by the following expression.

$$DD = (R1 + n3) - F1 + (R2 - n3) - F2 \quad (4)$$
$$= R1 - F1 + R2 - F2$$

That is, as the noise n3 relating to the rising edge of the first pulse of the AC drive signal VcomAC and the noise (-n3) relating to the rising edge of the second pulse of the AC drive signal VcomAC cancel each other out in this example, the noise n3 does not appear in the detection data DD as shown in the expression (4). In other words, as the noises n3 and -n3 (a pair P3) having reverse polarities are generated at the transition timing pair PB having the same polarity in the AC drive signal VcomAC in the noise signal VN3 in the same manner as the case of the noise signal VN2, the noises cancel each other out. Therefore, the noise signal VN3 does not affect the touch detection operation.

The frequency of the noise signal VN2 is 3 times of the frequency of the noise signal VN3, and noises are cancelled out in the noise signals VN2 and VN3 due to the same principles as described above. Accordingly, in the noise signals having odd-number multiple frequencies of the noise signal VN3, noises are cancelled out due to the same principles, which do not affect the touch detection operation.

As explained above, the display panel 1 can cancel out noises in noise signals having various frequencies such as the noise signals VN1 to VN3. These frequencies can be changed by adjusting, for example, the time period "tw". Accordingly, in the display panel 1, the pulse width and the pulse interval of the AC drive signal VcomAC are adjusted so as to cancel out noises in the case where the frequency of disturbance noise is known, thereby improving resistance with respect to the disturbance noise.

As described above, the AC drive signal includes plural pulses in the display panel 1, therefore, resistance with respect to noises having plural frequencies (125 [kHz], 375 [kHz], 500 [kHz] and so on in the example) can be increased. Accordingly, the resistance with respect to disturbance noise can be improved not only in the case where disturbance noise of single frequency is applied but also in the case where, for example, disturbance noise of plural frequencies or disturbance noise with a wider spectrum is applied in the display panel 1.

In the display panel 1, one touch detection period Pt is provided in each display operation of two rows. That is, two touch detection periods in the case where the touch detection period is provided in each display operation of one row are integrated into one period in the display panel 1, thereby obtaining one touch detection period Pt having a longer time width. In the display panel 1, the resistance with respect to noise is increased by effectively using the longer touch detection period Pt obtained in the above manner. Namely, in the display panel 1, the touch detection operation is performed by using the AC drive signal VcomAC having plural pulses in the touch detection period Pt, thereby cancelling out noises of plural frequencies as described above, which can increase the resistance with respect to noise.

As described above, the touch detection period Pt is provided in each display operation of two rows in the display panel 1, therefore, a large unit of time for the touch detection operation can be secured and thus the degree of freedom in the touch detection operation can be improved.

[Effects]

As the touch detection period is provided in each display operation of plural rows in the embodiment as described above, the longer touch detection period can be obtained and the degree of freedom in the touch detection operation can be increased. Specifically, for example, the number of pulses of the AC drive signal to be applied during the touch detection period can be increased or the pulse width or a pulse position can be changed.

In particular, in the case where the AC drive signal includes plural pulses in the touch detection period secured as described above in the embodiment, noises in plural noise signals having frequencies different from one another can be cancelled out and the danger of malfunction due to noise can be reduced.

[Modification Example 1-1]

The one touch detection period Pt is provided in each display operation of two rows in the above embodiment, however, the present disclosure is not limited to the above, and any other configurations can be applied as long as the touch detection periods Pt which are lower in number than the number of rows are provided in each display operation of a plural number of rows. Specifically, for example, it is possible to provide one touch detection period Pt in each display operation of four rows as shown in FIGS. 14A and 14B. As the time width of the touch detection period Pt can be longer than the case of the embodiment (FIGS. 10A to 10F) in this case, the degree of freedom in the touch detection operation can be increased, such that the AC drive signal VcomAC includes much more pulses (four pulses in this example). Additionally, for example, three touch detection periods Pt may be provided in each display operation of four rows as shown in FIGS. 15A and 15B. In the example, the touch detection periods Pt1 to Pt3 and the display periods Pd1 to Pd4 are arranged in the order of Pt1, Pd1, Pt2, Pd2, Pt3, Pd3 and Pd4. As described above, as the touch detection periods Pt which are lower in number than the number of rows are provided in each display operation of a plural number of rows, thereby allowing the touch detection period to be longer and increasing the degree of freedom in the touch detection operation.

[Modification Example 1-2]

The AC drive signal VcomAC includes two pulses in the above embodiment, however, the present disclosure is not limited to the above, and it is possible to the AC drive signal VcomAC includes, for example, three or more pulses instead of the above. According to the configuration, much more noise components can be cancelled out and the resistance with respect to disturbance noise can be improved.

[Modification Example 1-3]

The pulse widths and the pulse intervals of the AC drive signal VcomAC are equal to one another in the above embodiment, however, the present disclosure is not limited to the above, and it is possible to allow the pulse widths and the pulse intervals of respective pulses to be different from one another instead of the above.

[Modification Example 1-4]

In addition to the above configurations of the embodiments, it is also preferable to set the time width of the unit drive period PU to be variable. Accordingly, the resistance with respect to disturbance noise in the vicinity of an integral multiple frequency corresponding to a reciprocal of the time period of the unit drive period PU can be further increased. Hereinafter, the details of the display panel according to the present modification example will be explained.

FIGS. 16A to 16D represent timing charts of an operation in the case where the time width of the unit drive period PU is short and FIGS. 16E to 16H represent timing charts of an operation in the case where the time width of the unit drive period PU is long. In FIGS. 16A to 16H, FIGS. 16A and 16E represent waveforms of the scanning signals Vscan, FIGS. 16B and 16F represent waveforms of the pixel signals Vsig, FIGS. 16C and 16G represent waveforms of the switch control signals Vsel and FIGS. 16D and 16H represent waveforms of the drive signals Vcom.

In the display panel according to the present modification example, the time width of the unit drive period PU can be changed as shown in FIGS. 16A to 16H. Specifically, the time width of the unit drive period PU is changed by changing a time period after the scanning signal Vscan is changed from the high level to the low level in respective display periods Pd1 and Pd2. Accordingly, the danger of malfunction in the touch detection operation due to disturbance noise can be reduced.

When the disturbance noise is A/D converted in the A/D converser 43 in the case where the frequency of disturbance noise is in the vicinity of the integral multiple frequency corresponding to a reciprocal of the time period of the unit drive period PU, the disturbance noise appears in the vicinity of a frequency "0" as a so-called folding noise. As a result, the folding noise is mixed with a touch signal in the vicinity of the frequency "0", it is difficult to distinguish between the touch signal and the noise signal. As the time width of the unit drive period PU can be changed in the display panel according to the present modification example, the touch detection can be performed by selecting conditions in which the touch detection is not affected by disturbance noise.

[Modification Example 1-5]

The unit drive period PU includes the display period Pd1 and Pd2 relating to the n-th row and the (n+1)th row in the above embodiment, and it is possible to change the configuration according to frames. The details will be explained below.

FIGS. 17A and 17B represent timing charts of an operation in a certain frame period Pf1 and FIGS. 17C and 17D represent timing charts of an operation in another certain frame period Pf2. In FIGS. 17A to 17D, FIGS. 17A and 17C represent waveforms of the scanning signals Vscan and FIGS. 17B and 17D represent waveforms of the drive signals Vcom. In the display panel according to the present modification example, the frame period Pf1 and the frame period Pf2 are alternately arranged.

As shown in FIGS. 17A to 17D, display periods relating to the n-th row and the (n+1)th row form the unit drive period PU in the frame period Pf1, and display periods relating to the (n+1)th row and the (n+2)th row form the unit drive period PU in the frame period Pf2. In other words, for example, the display operation of the (n+1)th row is performed in the second display period Pd2 in the unit drive period PU in the frame period Pf1 (FIGS. 17A and 17B), and the display operation of the (n+1)th row is performed in the first display period Pd1 in the unit drive period PU in the frame period Pf2 (FIGS. 17C and 17D).

The present modification example is effective, for example, when the touch detection operation in the touch detection period Pt affects the display operation in the display period Pd1 just after the touch detection period Pt. That is, for example, the display operation of the (n+1)th row is performed in the display period Pd1 in the frame period Pf2 as shown in FIGS. 17C and 17D in this case, therefore, the display operation is affected by the touch detection operation in the touch detection period Pt existing before the display period Pd1, however, the display operation of the (n+1)th row is performed in the display period Pd2 in the frame period Pf1 as shown in FIGS. 17A and 17B, therefore, the display operation is not affected by the touch detection operation. Similarly, display operations of other rows are affected by the touch detection operation only in one of the frame periods Pf1 and Pf2. Accordingly, as display operations, for example, in particular rows are not affected by the touch detection operation in the display panel according to the present modification example, the reduction in image quality can be suppressed.

<3. Second Embodiment>

Next, a display panel 5 according to a second embodiment will be explained. The embodiment is configured so that the pulse width of the AC drive signal VcomAC can be changed by using the high degree of freedom in the touch detection operation obtained by securing a longer touch detection period. That is, the AC drive signal includes plural pulses to thereby increase the resistance with respect to plural noises having frequencies different from one another in the first embodiment (FIGS. 11A and 11B). In the present embodiment, the same effect can be obtained by changing the pulse width instead of the above. Components substantially the same as the display panel 1 according to the first embodiment are denoted by the same symbols and the explanation will be appropriately omitted.

The display panel 5 includes a drive electrode driver 56 (FIG. 4). The drive electrode driver 56 generates an AC drive signal VcomAC including one pulse. In the operation, the drive electrode driver 56 can change the pulse width of the pulse.

FIGS. 18A and 18B represent waveforms of the AC drive signal VcomAC and the touch detection signal Vdet in the case where the pulse width is narrowed (case C1), and FIGS. 18C and 18D represent waveforms of the AC drive signal VcomAC and the touch detection signal Vdet in the case where the pulse width is widened (case C2). A pulse width "tw2" (FIG. 18A) in the case C1 is, for example, 4 [usec] and a pulse width "tw3" (FIG. 18C) in the case C2 is, for example, 6 [usec]. These AC drive signals VcomAC (FIGS. 18A and 18C) are transmitted to the touch detection electrodes TDL through capacitance in the same manner as the case of the first embodiment, thereby generating the touch detection signals Vdet shown in FIGS. 18B and 18D.

The A/D converter 43 of the touch detection unit 40 performs A/D conversion of the output signal of the LPF unit 42 to which the touch detection signal Vdet is inputted at timings before and after respective transitions in the AC drive signal VcomAC (sampling timings ts1 to ts4) (FIGS. 18B and 18D) to calculate data D (ts1) to Data D(ts4).

Then, the signal processing unit 44 of the touch detection unit 40 calculates variations R1 (=D(ts2)−D(ts1)) and F1 (=D(ts4)−D(ts3)) of the touch detection signal Vdet in respective transitions based on these data D(ts1) to D(ts4). That is, a variation R1 has a positive values (R1>0) and a variation F1 has a negative value (F1<0).

Next, the signal processing unit 44 calculates a detection data DD in the touch detection period Pt by using the following expression based on these variations R1 and F1.

$$DD = R1 - F1 \qquad (5)$$

Then, the signal processing unit 44 performs touch detection based on the detection data DD collected in plural unit drive period PU in the same manner as the case of the first embodiment.

Subsequently, operations performed when disturbance noise is applied will be explained concerning the case where the pulse width is narrowed (case C1) and the case where the pulse width is widened (case C2) respectively in this order.

FIGS. 19A to 19C schematically show sampling operations performed when the pulse width is narrowed (case C1), in which FIG. 19A shows a waveform of the AC drive signal VcomAC and FIGS. 19B and 19C respectively show examples of noise signals to be superimposed on the touch detection signal Vdet.

The noise signal VN4 (FIG. 19B) is a signal with a cycle of the half of the time period "tw2", and a frequency thereof is 500 [kHz] when the time period "tw2" is 4 [usec]. As shown in FIG. 19B, the noise signal VN4 changes with the same variation (noise n4) at respective transitions of the AC drive signal VcomAC. Therefore, when the noise signal VN4 is superimposed on the touch detection signal Vdet, the detection data DD is represented by the following expression.

$$DD = (R1 + n4) - (F1 + n4) \qquad (6)$$
$$= R1 - F1$$

That is, for example, the noise n4 relating to the rising edge of the AC drive signal VcomAC and the noise n4 relating to the falling edge cancel each other out, therefore, the noise n4 does not appear in the detection data DD as shown in the expression (6).

The noise signal VN5 (FIG. 19C) is a signal with a cycle of the time period "tw2", and a frequency thereof is 250 [kHz] when the time period "tw2" is 4 [usec]. As shown in FIG. 19C, the noise signal VN5 changes with the same variation (noise n5) at respective transitions of the AC drive signal VcomAC. Therefore, the noise n5 does not appear in the detection data DD in the same manner as the case of the noise signal VN4.

As described above, the noises having the same polarity are generated at a transition timing pair PC having reverse polarities in the AC drive signal VcomAC in the noise signals VN4 and VN5, therefore, the noises cancel each other out. Similarly, in the noise signals having integral multiple frequencies of the noise signal VN5, noises are also cancelled out due to the same principles, which do not affect the touch detection operation.

FIGS. 20A to 20D schematically show sampling operations performed when the pulse width is widened (case C2), in which FIG. 20A shows a waveform of the AC drive signal VcomAC and FIGS. 20B and 20D respectively show examples of noise signals to be superimposed on the touch detection signal Vdet.

The noise signal VN6 (FIG. 20B) is a signal with a cycle of ⅓ of the time period "tw3", and a frequency thereof is 500 [kHz] when the time period "tw3" is 6 [usec]. As shown in FIG. 20B, the noise signal VN6 changes with the same variation (noise n6) at respective transitions of the AC drive signal VcomAC. Therefore, when the noise signal VN6 is superimposed on the touch detection signal Vdet, the detection data DD is represented by the following expression.

$$DD = (R1 + n6) - (F1 + n6) \quad (7)$$
$$= R1 - F1$$

That is, for example, the noise n6 relating to the rising edge of the AC drive signal VcomAC and the noise n6 relating to the falling edge cancel each other out, therefore, the noise n6 does not appear in the detection data DD as shown in the expression (7).

The noise signal VN7 (FIG. 20C) is a signal with a cycle of the half of the time period "tw3", and a frequency thereof is 333 [kHz] when the time period "tw3" is 6 [usec]. As shown in FIG. 20C, the noise signal VN7 changes with the same variation (noise n7) at respective transitions of the AC drive signal VcomAC. Therefore, the noise n7 does not appear in the detection data DD in the same manner as the case of the noise signal VN6.

The noise signal VN8 (FIG. 20D) is a signal with a cycle of the time period "tw3", and a frequency thereof is 166 [kHz] when the time period "tw3" is 6 [usec]. As shown in FIG. 20D, the noise signal VN8 changes with the same variation (noise n8) at respective transitions of the AC drive signal VcomAC. Therefore, the noise n8 does not appear in the detection data DD in the same manner as the case of the noise signal VN6.

As described above, the noises having the same polarity are generated at a transition timing pair PD having reverse polarities in the AC drive signal VcomAC in the noise signals VN6 to VN8, therefore, the noises cancel each other out. Similarly, in the noise signals having integral multiple frequencies of the noise signal VN8, noises are also cancelled out due to the same principles, which do not affect the touch detection operation.

As described above, in the display panel 5, noises such as 250 [kHz], 500 [kHz] and so on can be cancelled out in the example when the pulse width is narrowed (case C1) and noises such as 166 [kHz], 333 [kHz], 500 [kHz] and so on can be cancelled out when the pulse width is widened (case C2). Consequently, it is possible to increase the resistance with respect to noises with various frequencies by changing the pulse width in the display panel 5.

Specifically, for example, it is preferable that, after a condition (pulse width) in which effects of noises are reduced by changing the pulse width is calculated, the touch detection operation is performed in the condition, or for example, it is also preferable that the touch detection is performed while changing the pulse width in each given period (for example, one frame period), and only detection results in conditions with many noises are thrown away. Furthermore, it is preferable that the touch detection operation is normally performed with a given pulse width, and the touch detection operation is continued by changing the pulse width when noise is observed. As methods of measuring noise, for example, a method of using detection data on the whole surface of the touch detection surface obtained by the touch detection operation or a method of providing a dedicated frame for measuring noise can be considered.

As described above, the pulse width of the AC drive signal is changed in the longer touch detection period in which the touch detection period is provided in each display operation of plural rows in the present embodiment, therefore, noises in plural noise signals having frequencies different from one another can be cancelled out and the danger of malfunction due to noise can be reduced.

[Modification Example 2-1]

The pulse width is switched between two pulse widths "tw2" and "tw3" (cases C1 and C2) in the above embodiment, however, the present disclosure is not limited to the above and the pulse width may be switched between three or more pulse widths instead of the above.

[Modification Example 2-2]

The modification examples 1-1, 1-4 and 1-5 of the first embodiment can be applied in the above embodiment.

[Modification Example 2-3]

In the above embodiment, the detection data DD obtained by using the AC drive signal VcomAC having the same pulse width is averaged by the FIR filter to thereby perform touch detection, however, the present disclosure is not limited to the above. It is also preferable that the detection data DD obtained by using the AC drive signal VcomAC having pulse widths different from one another while switching the pulse width in units of unit detection periods PU is averaged by the FIR filter to perform touch detection.

<4. Third Embodiment>

Next, a display panel 6 according to a third embodiment will be explained. The embodiment is configured so that the number of pulses of the AC drive signal VcomAC is increased in the same manner as the first embodiment as well as the pulse width and the pulse interval can be changed by using the high degree of freedom in the touch detection operation obtained by securing the longer touch detection period. Components substantially the same as the display panels 1 and 2 according to the first and second embodiments are denoted by the same symbols and the explanation will be appropriately omitted.

The display panel 6 includes a drive electrode driver 66 (FIG. 4). The drive electrode driver 66 generates the AC drive signal VcomAC including plural pulses. In the operation, the drive electrode driver 66 can change the pulse width and the pulse interval.

FIGS. 22A and 22B represent examples of waveforms of the AC drive signal VcomAC and the touch detection signal Vdet, FIGS. 22C and 22D represent waveforms of the AC drive signal VcomAC and the touch detection signal Vdet obtained when the pulse width is narrowed while maintaining a pulse cycle and FIGS. 22E and 22F represent waveforms of the AC drive signal VcomAC and the touch detection signal Vdet obtained when the pulse interval is narrowed while maintaining the pulse width.

The A/D converter 43 of the touch detection unit 40 performs A/D conversion of the output signal of the LPF unit 42 to which the touch detection signal Vdet is inputted at timings before and after respective transitions in the AC drive signal VcomAC (sampling timings ts1 to ts8) (FIGS. 22B, 22D and 22F) to calculate data D (ts1) to Data D (ts8) in the same manner as the first embodiment. Then, the signal processing unit 44 of the touch detection unit 40 calculates detection data DD based on the data D(ts1) to D(ts8), and performs touch detection based on the detection data DD.

In the display panel 6, the touch detection is performed in conditions with reduced noise by changing the pulse width or the pulse interval in the same manner as in the case of the display panel 5 according to the second embodiment, thereby increasing the resistance with respect to noises of various frequencies.

As described above, the AC drive signal includes plural pulses as well as the pulse width and the pulse interval are changed in the longer touch detection period in which the touch detection period is provided in each display operation of plural rows, therefore, the danger of malfunction due to noise can be reduced. Other effects are the same as the cases of the first and second embodiments.

[Modification Example 3-1]

The modification examples 1-1, 1-2, 1-4 and 1-5 of the first embodiment can be applied in the above embodiment.

[Modification Example 3-2]

Also in the above embodiment, it is possible to perform touch detection operation while switching the pulse width, for example, in each unit drive period PU in the same manner as the modification example 2-3 of the second embodiment.

<5. Fourth Embodiment>

Next, a display panel 7 according to a forth embodiment will be explained. The embodiment is configured so that a pulse position of the AC drive signal VcomAC can be changed by using the high degree of freedom in the touch detection operation obtained by securing a longer touch detection period. Components substantially the same as the display panels 1, 5 and 6 according to the first to third embodiments are denoted by the same symbols and the explanation will be appropriately omitted.

The display panel 7 includes a drive electrode driver 76 (FIG. 4). The drive electrode driver 76 generates the AC drive signal VcomAC including one pulse. In the operation, the drive electrode driver 76 can change the pulse position.

FIGS. 23A and 23B represent timing waveform examples of the display panel 7, in which FIG. 23A represents waveforms of the scanning signals Vscan and FIG. 23B represents the drive signal Vcom.

As shown in FIGS. 23A and 23B, the drive electrode driver 76 generates the AC drive signal Vcom in which pulse positions are different from one another in respective touch detection periods Pt. Accordingly, pulse intervals (T1, T2) of the AC drive signal Vcom can be changed in the display panel 7, which can reduce the danger of malfunction in the touch detection operation due to disturbance noise in the same manner as the modification example 1-4 of the first embodiment (FIGS. 16A to 16H).

As described above, the pulse position of the AC drive signal is changed in each the longer touch detection period in which the touch detection period is provided in each display operation of plural rows in the present embodiment, which can reduce the danger of malfunction due to noise.

[Modification Example 4-1]

The modification examples 1-1 and 1-5 of the first embodiment can be applied in the above embodiment.

<6. Fifth Embodiment>

Next, a display panel 8 according to a fifth embodiment will be explained. A high-definition liquid crystal display device is used in the present embodiment. Components substantially the same as the display panel 1 according to to the first embodiment are denoted by the same symbols and the explanation will be appropriately omitted.

The display panel 8 includes a display device with a touch detection function 80 having a liquid crystal display device 81 (FIG. 4). The liquid crystal display device 81 can perform display, for example, HD (High Definition) video, which has a resolution of, for example, 1920 pixels×1080 pixels.

FIGS. 24A to 24F represent timing waveform examples of the display panel 8, in which FIG. 24A represents waveforms the scanning signals Vscan, FIG. 24B represent a waveform of the pixel signal Vsig, FIG. 24C represent waveforms of the switch control signals Vsel, FIG. 24D represent waveforms of the pixel signals Vpix, FIG. 24E represent waveforms of the drive signal Vcom and FIG. 24F represent a waveform of the touch detection signal Vdet.

In the display panel 8, the touch detection operation (touch detection period Pt) and the display operation of two rows (display periods Pd1 and Pd2) are performed in each unit drive period PU in the same manner as the display panel 1 and the like according to the first embodiment. In the example, the AC drive signal VcomAC includes one pulse. As the resolution of the liquid crystal display device 81 is high in the display panel 8, the time width of the unit drive period PU is shorter than the display panel 1 according to the first embodiment (FIGS. 10A to 10F).

It is difficult to perform touch detection operation in the high-resolution display panel. That is, it is necessary to perform display operation of many horizontal lines in one frame period (for example, 16.6 [msec]=1/60 [Hz]) when the resolution is high, time to be assigned to the touch detection operation is reduced.

In the display panel 8, one touch detection period Pt is provided in each display operation of two rows as shown in FIGS. 24A to 24F, thereby securing a longer period of time for the touch detection operation. Accordingly, the touch detection operation can be performed by using the AC drive signal VcomAC by effectively using the touch detection period Pt secured in the above manner in the display panel 8.

As described above, the touch detection period is provided in each display operation of plural rows in the present embodiment, therefore, a sufficient period of time for performing the touch detection operation can be secured even when the resolution of the display panel is high.

[Modification Example 5-1]

One touch detection period Pt is provided in each display operation of two rows in the above embodiment, however, the present disclosure is not limited to this, and any other configurations can be applied as long as the touch detection periods Pt which are lower in number than the number of rows are provided in each display operation of a plural number of rows. Accordingly, it is possible to set the touch detection period to be longer, therefore, the touch detection operation can be performed even when the resolution of the display panel is high.

[Modification Example 5-2]

The AC drive signal VcomAC includes one pulse in the above embodiment, however, the present disclosure is not limited to the above, and it is also preferable that the AC drive signal VcomAC includes plural pulses in the same manner as the first embodiment and so on. It is also preferable that the display panel is configured so that the pulse width of the AC drive signal VcomAC can be changed. Accordingly, noise components of various frequencies can be cancelled out and the resistance with respect to these disturbance noises can be increased. It is further preferable to apply respective modification examples of the first and second embodiments.

<7. Application Examples>

Next, application examples of the display panel explained in the above embodiments and the modification examples will be explained.

FIG. 25 shows an appearance of a television apparatus to which the display panel according to the above embodiments and the like is applied. The television apparatus has, for example, a video display screen unit 510 including a front panel 511 and a filter glass 512, in which the video display screen unit 510 is configured by using the display panel according to the above embodiments and so on.

The display panel according to the above embodiments and so on can be applied to electronic apparatuses in various fields, which are, for example, a digital camera, a notebook personal computer, portable terminal devices such as a cellular phone, portable game machines, a video camera and so on, in addition to the television apparatus. In other words, the display panel according to the above embodiments and so on can be applied to electronic apparatuses in various fields which display video.

The technology of the present disclosure has been explained as the above by citing some embodiments, modification examples and application examples to the electronic apparatus, and the technology of the present disclosure is not limited to the above embodiments and so on and various modifications can be made.

For example, the selection switch unit 14 is provided and the pixel signals Vpix are separated from the pixel signal Vsig supplied from the source driver 13 and supplied to the liquid crystal display device 20 in the respective embodiments, however, the present disclosure are not limited to this, and it is also preferable that the selection switch unit 14 is not provided and that the source driver 13 directly supplies the pixel signals Vpix to the liquid crystal display device 20.

For example, the drive electrode driver 16 applies the DC drive signal VcomDC to the drive electrodes COML at the time of the display operation in the respective embodiments, however, the present disclosure is not limited to the above, and for example, a so-called COM inverse drive in which the AC drive signal is applied to the drive electrodes COML may be performed instead of the above.

Furthermore, for example, the drive electrodes COML are driven and scanned in units of drive electrode blocks B each having the given number of drive electrodes COML at the time of the touch detection operation in the above respective embodiments and so on, however, the present disclosure is not limited to the above. It is also possible to simultaneously drive the given number of drive electrodes COML as well as to scan the drive electrodes COML to be scanned by shifting the electrodes one by one instead of the above. The details thereof will be explained below.

FIGS. 26A to 26C schematically show an example of a touch detection operation according to the modification example. A drive electrode driver according to the modification example applies the AC drive signal VcomAC to the given number of drive electrodes COML at the same time. Specifically, the drive electrode driver applies the AC drive signal VcomAC to the given number (5 in the example) of drive electrodes COML at the same time (shaded portions) and performs touch detection scanning by shifting the drive electrodes COML to which the AC drive signal VcomAC is applied one by one. The AC drive signal VcomAC is applied to five drive electrodes COML at the same time in the example, however, the present disclosure is not limited to this, and it is also preferable to apply the AC drive signal VcomAC simultaneously to the drive electrodes COML of four or less as well as 6 or more instead of the above. The drive electrodes COML to which the AC drive signal VcomAC is applied are shifted one by one in the example, however, the present disclosure is not limited to this. It is also possible to shift the drive electrodes COML in units of two or more electrodes.

Additionally, the AC drive signal VcomAC includes positive-voltage pulses based on the DC drive signal VcomDC, for example, shown in FIG. 11A, however, the present disclosure is not limited to the above, and the AC drive signal VcomAC may include negative-voltage pulses instead of the above. It is also preferable that the AC drive signal VcomAC includes both the positive-voltage pulse and the negative-voltage pulse as shown, for example, in FIG. 27A and FIG. 28A. The AD drive signal VcomAC shown in FIG. 27A includes a positive-voltage pulse in the first pulse and a negative-voltage pulse in the second pulse. The AD drive signal VcomAC shown in FIG. 28A is a signal in which the pulse interval between two pulses shown in FIG. 27A is "0" (zero).

Furthermore, in the above respective embodiments and so on, for example, the drive electrodes COML are formed on the TFT substrate 21 and the pixel electrodes 22 are formed thereon through the insulating film 23 as shown in FIG. 6, however, the present disclosure is not limited to the above. It is also preferable that the pixel electrodes 22 are formed on the TFT substrate 21 and the drive electrodes COML are formed thereon through the insulating film 23 instead of the above.

Figure 29:
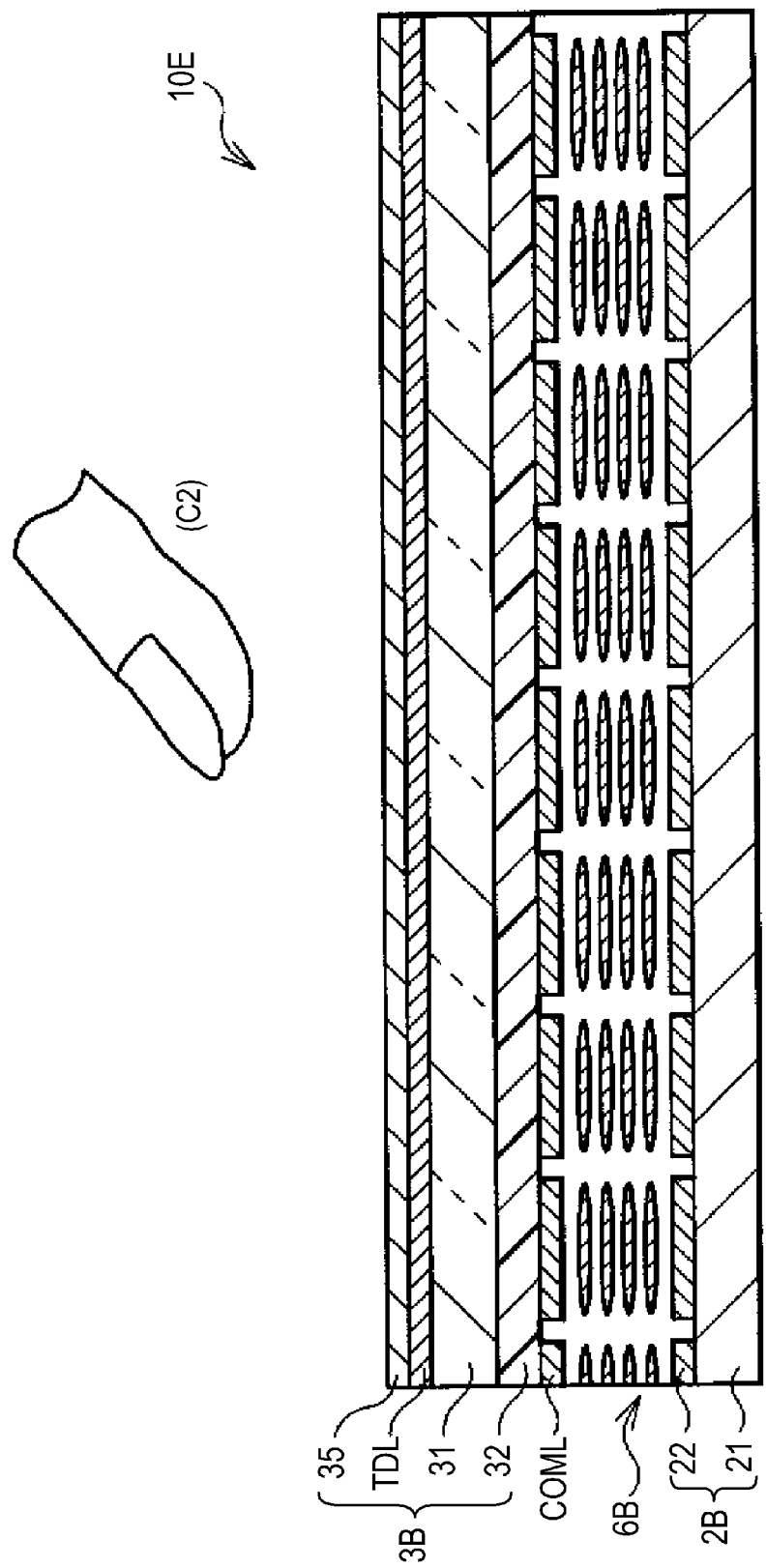
FIG. 29 is a cross-sectional view showing a schematic cross sectional structure of a display device with a touch detection function according to further another modification example.

Additionally, the liquid crystal display device using lateral-electric field mode liquid crystal such as FFS or IPS is integrated with the touch detection device in the above respective embodiments and so on, however, it is also preferable that liquid crystal display devices using liquid crystal of various modes such as TN (Twisted Nematic), VA (Vertical Alignment), ECB (Electrically Controlled Birefringece) can be integrated with the touch detection device. When such liquid crystal is used, the display device with the touch detection function can be configured as shown in FIG. 29. FIG. 29 shows an example of a cross-sectional structure of a relevant part of a display device with a touch detection function 10E according to the modification example, showing a state where a liquid crystal layer 6B is sandwiched between a pixel substrate 2B and a counter substrate 3B. Names and functions of other respective portions are the same as the case of FIG. 6, the explanation is omitted. The example differs from the case of FIG. 6 in a point that the drive electrodes COML used as both for display and for touch detection are formed on the counter substrate 3B.

The capacitance-type touch detection device is applied as an example in the above respective embodiment, however, the present disclosure is not limited to this, and for example, an optical type or a resistive type device can be also applied instead of the above.

The liquid crystal device is used as the display device as an example in the above respective embodiments, however, the present disclosure is not limited to this, and for example, an EL (Electroluminescence) device can be also applied instead of the above.

The present disclosure may be implemented as the following configurations.

(1) A display apparatus including
a display device,
a touch detection device, and
a driver unit driving the display device so as to sequentially display M horizontal lines in each of plural unit drive periods forming one frame period and driving the touch detection device in N touch detection periods provided in each unit drive period, in which N is lower than M.

(2) The display apparatus described in the above (1),
in which the driver unit drives the touch detection device before displaying each of N horizontal lines in M horizontal lines in each unit drive period.

(3) The display apparatus described in the above (1) or (2),
in which the touch detection device has
drive electrodes, and
touch detection electrodes forming capacitance between the touch detection electrodes and the drive electrodes, and
the driver unit applies an AC drive signal which makes a transition once or more in each touch detection period to the drive electrodes.

(4) The display apparatus described in the above (3),
in which the AC drive signal has one or plural pulses.

(5) The display apparatus described in the above (4),
in which a pulse width of the AC drive signal in one touch detection period is different from a pulse width of the AC drive signal in another touch detection period.

(6) The display apparatus described in the above (4) or (5),
in which a pulse position of the AC drive signal in one touch detection period is different from a pulse position of the AC drive signal in another touch detection period.

(7) The display apparatus described in any one of the above (3) to (6), further including
a detection unit sampling a detection signal outputted from the touch detection electrodes at timings before and after respective transitions of the AC drive signal to detect a touch based on variations in sampling results in respective transitions.

(8) The display apparatus described in any one of the above (1) to (7),
in which the "N" is 1.

(9) The display apparatus described in any one of the above (1) to (8),
in which a turn in which one horizontal line is display-driven in the unit drive period to which one horizontal line belongs in one frame period is different from a turn in which one horizontal line is display-driven in the unit drive period to which one horizontal line belongs in another frame period.

(10) The display apparatus described in any one of the above (3) to (7),
in which the driver unit applies the AC drive signal in units of a given number of respective drive electrodes.

(11) The display apparatus described in the above (10),
in which the driver unit applies the AC drive signal to the same drive electrodes over a given number of unit drive periods.

(12) The display apparatus described in any one of the above (3) to (7),
in which the display device includes
a liquid crystal layer, and
pixel electrodes formed between the liquid crystal layer and the drive electrodes or arranged opposite to the liquid crystal layer so as to sandwich the drive electrodes.

(13) The display apparatus described in any one of the above (3) to (7),
in which the display device includes
a liquid crystal layer, and
pixel electrodes arranged opposite to the drive electrodes so as to sandwich the liquid crystal layer.

(14) The display apparatus described in the above (12) or (13),
in which the driver unit applies a display drive signal to the drive electrodes in periods other than the touch detection period.

(15) A drive circuit including
a driver unit driving a display device so as to sequentially display M horizontal lines in each of plural unit drive periods forming one frame period and driving a touch detection device in N touch detection periods provided in each unit drive period, in which N is lower than M.

(16) A driving method including
driving a display device so as to sequentially display M horizontal lines in each of plural unit drive periods forming one frame, and
driving a touch detection device in N touch detection periods provided in each unit drive period, in which N is lower than M.

(17) An electronic apparatus including
a display apparatus, and
a control unit performing operation control using the display apparatus,
in which the display apparatus has
a display device,
a touch detection device, and
a driver unit driving the display device so as to sequentially display M horizontal lines in each of plural unit drive periods forming one frame period and driving the touch detection device in N touch detection periods provided in each unit drive period, in which N is lower than M.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A display apparatus comprising:
a plurality of display elements including pixel electrodes;
a plurality of drive electrodes facing the pixel electrodes; and;
a plurality of touch detection elements including touch detection electrodes facing the drive electrodes;
a driver unit configured to cause the display elements to display images and to cause the touch detection elements to detect a touch; and a control unit configured to cause the driver unit to:
divide a frame in which images are displayed by the display elements, into a plurality of display periods; and
determine a touch detection period between adjacent display periods in one frame, the touch detection period being a period in which the touch detection elements detect a touch,
wherein the driver unit is configured to apply an AC driving signal to the drive electrode to be a target of the touch detection operation during the touch detection period so that the touch detection element makes the touch detection, is configured to apply a DC drive signal to all the drive electrodes, and is configured to apply a pixel signal to the pixel electrode to be a target of the display operation during the display period so that the display elements display an image, and
wherein the control unit is configured to control the driver unit to have a first period in which the display period and the touch detection period are provided alternately, and a second period in which the display period is provided continuously.

2. The display apparatus according to claim 1, wherein the touch detection elements include drive electrodes and touch detection electrodes,
a capacitance is formed between the touch detection electrodes and the drive electrodes, and
the driver unit is configured to apply an AC drive signal which causes at least one transition to the drive electrodes in each touch detection period.

3. The display apparatus according to claim 2,
wherein the AC drive signal has at least one pulse.

4. The display apparatus according to claim 3,
wherein a pulse width of the AC drive signal in one touch detection period is different from a pulse width of the AC drive signal in another touch detection period.

5. The display apparatus according to claim 3,
wherein a pulse position of the AC drive signal in one touch detection period is different from a pulse position of the AC drive signal in another touch detection period.

6. The display apparatus according to claim 2, further comprising:
a detection unit configured to sample a detection signal that is output from the touch detection electrodes at timings before and after respective transitions of the AC drive signal to detect a touch based on variations in sampling results in respective transitions.

7. The display apparatus according to claim 2,
wherein the control unit is configured to apply the AC drive signal in units of a given number of respective drive electrodes.

8. The display apparatus according to claim 2,
further comprising a liquid crystal layer,
wherein the pixel electrodes are formed between the liquid crystal layer and the drive electrodes, or are arranged opposite to the liquid crystal layer so as to sandwich the drive electrodes.

9. The display apparatus according to claim 8,
wherein the control unit is configured to apply a display drive signal to the drive electrodes in periods other than the touch detection period.

10. The display apparatus according to claim 2,
further comprising a liquid crystal layer,
wherein the pixel electrodes are arranged opposite to the drive electrodes so as to sandwich the liquid crystal layer.

11. The display apparatus according to claim 1, wherein
during the touch detection period, the driver unit is configured to apply the AC driving signal to the drive electrode to be a target of the touch detection operation and apply the DC driving signal to the drive electrode other than the target of the touch detection operation so that the touch detection electrode of which the AC driving signal is applied makes the touch detection.

12. A driver unit configured to:
cause a plurality of display elements including pixel electrodes to display images by driving a plurality of drive electrodes that face the pixel electrodes;
cause a plurality of touch detection elements which face the drive electrodes to detect a touch by driving the drive electrodes;
divide a frame in which images is displayed by the display elements, into a plurality of display periods;
determine a touch detection period between adjacent display periods in one frame, the touch detection period being a period in which the touch detection elements detect a touch;
apply an AC driving signal to the drive electrode to be a target of the touch detection operation during the touch detection period so that the touch detection element makes the touch detection; and
apply a DC drive signal to all the drive electrodes, and apply a pixel signal to the pixel electrode to be a target of the display operation during the display period so that the display elements display an image,
wherein the control unit is configured to control the driver unit to have a first period in which the display period and the touch detection period are provided alternately, and a second period in which the display period is provided continuously.

13. The driver unit according to claim 12, wherein
the plurality of the display elements form one display screen, and
the driver circuit drives:
in the touch detection period, none of the display elements of the one display screen; and
in the display period, none of the touch detection elements.

* * * * *